(12) United States Patent
Mitsui et al.

(10) Patent No.: US 9,179,204 B2
(45) Date of Patent: Nov. 3, 2015

(54) OPTICAL NETWORK SYSTEM

(71) Applicant: NIPPON TELEGRAPH AND TELEPHONE CORPORATION, Tokyo (JP)

(72) Inventors: Takashi Mitsui, Tokyo (JP); Youichi Fukada, Tokyo (JP); Takeshi Sakamoto, Tokyo (JP); Naoto Yoshimoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/234,780

(22) PCT Filed: Oct. 12, 2012

(86) PCT No.: PCT/JP2012/076413
§ 371 (c)(1),
(2) Date: Jan. 24, 2014

(87) PCT Pub. No.: WO2013/058179
PCT Pub. Date: Apr. 25, 2013

(65) Prior Publication Data
US 2014/0219654 A1     Aug. 7, 2014

(30) Foreign Application Priority Data

Oct. 19, 2011  (JP) ................. 2011-229557
Oct. 19, 2011  (JP) ................. 2011-229559

(51) Int. Cl.
*H04B 10/03*     (2013.01)
*H04Q 11/00*     (2006.01)
(Continued)

(52) U.S. Cl.
CPC ......... *H04Q 11/0005* (2013.01); *H04B 10/032* (2013.01); *H04B 10/27* (2013.01);
(Continued)

(58) Field of Classification Search
CPC ........ H04Q 11/00–11/0005; H04Q 2011/0081
See application file for complete search history.

(56) References Cited

U.S. PATENT DOCUMENTS

| | | | | |
|---|---|---|---|---|
| 6,288,809 B1 * | 9/2001 | Touma et al. | ...................... | 398/9 |
| 6,771,908 B2 * | 8/2004 | Eijk et al. | ........................ | 398/66 |

(Continued)

FOREIGN PATENT DOCUMENTS

| | | | | |
|---|---|---|---|---|
| JP | 2007-067601 | * | 3/2007 | ............. H04L 12/44 |
| JP | 2007067601 | | 3/2007 | |
| JP | 2010147801 | | 7/2010 | |

OTHER PUBLICATIONS

International Preliminary Report on Patentability dated May 1, 2014 corresponding to PCT/JP2012/076413, 2 pp.
(Continued)

*Primary Examiner* — Li Liu
(74) *Attorney, Agent, or Firm* — Ohlandt Greeley Ruggiero & Perle L.L.P.

(57) ABSTRACT

A normal system OSU, a redundancy system OSU, an optical switch, a concentration switch, and a controller which detects a command input by operation control and performs control according to the command are provided, and in such a state that the controller detects a redundancy system switching command indicating that the normal system OSU is switched to the redundancy system OSU, the controller induces the concentration switch to change a storage destination of a down signal, instructs the normal system OSU which is the switching source OSU to stop transmission of a transmission permission message, instructs the optical switch to switch a path after receiving remaining data processing completion notifications from the concentration switch and the normal system OSU which is the switching source OSU, writes accumulated information about the normal system OSU, which is the switching source OSU, in the redundancy system OSU, and notifies the concentration switch of completion of switching, whereby a down signal is transmitted from the concentration switch.

20 Claims, 24 Drawing Sheets

(51) Int. Cl.
*H04B 10/032* (2013.01)
*H04B 10/27* (2013.01)

(52) U.S. Cl.
CPC ... *H04Q11/0067* (2013.01); *H04Q 2011/0037* (2013.01); *H04Q 2011/0043* (2013.01); *H04Q 2011/0081* (2013.01); *H04Q 2011/0088* (2013.01)

(56) References Cited

U.S. PATENT DOCUMENTS

| | | | |
|---|---|---|---|
| 6,778,781 B2* | 8/2004 | Van Eijk et al. | 398/100 |
| 6,868,232 B2* | 3/2005 | Eijk et al. | 398/5 |
| 7,865,077 B2* | 1/2011 | Mukojima | 398/1 |
| 8,600,228 B2* | 12/2013 | Rafel Porti et al. | 398/1 |
| 8,755,685 B2* | 6/2014 | Zheng et al. | 398/2 |
| 8,824,899 B2* | 9/2014 | Yamashita | 398/168 |
| 2002/0109875 A1* | 8/2002 | Eijk et al. | 359/110 |
| 2002/0109876 A1* | 8/2002 | Eijk et al. | 359/110 |
| 2002/0114028 A1* | 8/2002 | Eijk et al. | 359/110 |
| 2011/0026926 A1* | 2/2011 | Yamashita | 398/79 |

OTHER PUBLICATIONS

Written Opinion of the International Searching Authority dated Jan. 8, 2013 corresponding to PCT/JP2012/076413, 4 pp.
Kenji Tanaka, et al, "1:N OLT Redundant Protection Architecture in Ethernet PON System", 2008 Optical Society of America, OFC/NFOEC 2008, 6 pp.
"Part 3: Carrier Sense Multiple Access with Collision Detection (CSMA/CD) Access Method and Physical Layer Specifications" IEEE Std. 802.3ah-2004, 640 pp.
International Search Report dated Jan. 8, 2013 corresponding to PCT/JP2012/076413, 2 pp.

* cited by examiner

Fig. 5

| | MAC ADDRESS | CONNECTION DESTINATION OSU NUMBER | CONNECTION DESTINATION OPTICAL SWITCH PORT NUMBER | | CONNECTION DESTINATION CONCENTRATION SWITCH PORT NUMBER | LLID | REGISTER STATE |
|---|---|---|---|---|---|---|---|
| | | | INPUT SIDE | OUTPUT SIDE | | | |
| ONU1 | | 1 | 1 | 1 | 1 | 1 | registered |
| ..... | | ..... | ..... | ..... | ..... | ..... | ..... |
| ONU32 | | 1 | 1 | 1 | 1 | 32 | registered |
| ONU33 | | 2 | 2 | 2 | 2 | 33 | registered |
| ..... | | ..... | ..... | ..... | ..... | ..... | ..... |
| ONU64 | | 2 | 2 | 2 | 2 | 64 | registered |

Fig. 7

| | MAC ADDRESS | CONNECTION DESTINATION OSU NUMBER | CONNECTION DESTINATION OPTICAL SWITCH PORT NUMBER | | CONNECTION DESTINATION CONCENTRATION SWITCH PORT NUMBER | LLID | REGISTER STATE |
|---|---|---|---|---|---|---|---|
| | | | INPUT SIDE | OUTPUT SIDE | | | |
| ONU1 | | 1 | 1 | 1 | 1 | 1 | registered |
| ..... | | ..... | ..... | ..... | ..... | ..... | ..... |
| ONU32 | | 1 | 1 | 1 | 1 | 32 | registered |
| ONU33 | | 3 | 3 | 2 | 3 | 33 | registered |
| ..... | | ..... | ..... | ..... | ..... | ..... | ..... |
| ONU64 | | 3 | 3 | 2 | 3 | 64 | registered |

Fig. 18

| MAC ADDRESS | CONNECTION DESTINATION OSU NUMBER | CONNECTION DESTINATION OPTICAL SWITCH PORT NUMBER | | CONNECTION DESTINATION CONCENTRATION SWITCH PORT NUMBER | LLID | REGISTER STATE |
|---|---|---|---|---|---|---|
| | | INPUT SIDE | OUTPUT SIDE | | | |
| ONU1 | 1 | 1 | 1 | 1 | 1 | registered |
| ..... | ..... | ..... | ..... | ..... | ..... | ..... |
| ONU32 | 1 | 1 | 1 | 1 | 32 | registered |
| ONU33 | 2 | 2 | 2 | 2 | 33 | registered |
| ..... | ..... | ..... | ..... | ..... | ..... | ..... |
| ONU64 | 2 | 2 | 2 | 2 | 64 | registered |

Fig. 20

| | MAC ADDRESS | CONNECTION DESTINATION OSU NUMBER | CONNECTION DESTINATION OPTICAL SWITCH PORT NUMBER | | CONNECTION DESTINATION CONCENTRATION SWITCH PORT NUMBER | LLID | REGISTER STATE | ... |
| --- | --- | --- | --- | --- | --- | --- | --- | --- |
| | | | INPUT SIDE | OUTPUT SIDE | | | | |
| ONU1 | | 1 | 1 | 1 | 1 | 1 | registered | |
| ..... | | ..... | ..... | ..... | ..... | ..... | ..... | |
| ONU32 | | 1 | 1 | 1 | 1 | 32 | registered | |
| ONU33 | | 3 | 3 | 2 | 3 | 33 | registered | |
| ..... | | ..... | ..... | ..... | ..... | ..... | ..... | |
| ONU64 | | 3 | 3 | 2 | 3 | 64 | registered | |

OPTICAL NETWORK SYSTEM

BACKGROUND

1. Field of the Disclosure

This disclosure relates to a PON system.

2. Discussion of the Background Art

As broadband becomes widely available, access network communication is playing an increasingly important role, and thus, an access network is required to supply a service stably.

FIG. 23 shows a configuration including PON (Passive Optical Network) 11 and L2SW (Layer 2 switch) 12 as a typical configuration of a current access network. The PON 11 is constituted of an Optical Line Terminal (OLT, station-side termination apparatus) 14 storing a plurality of OSUs (Optical Subscriber Units) 15, an M:1 optical splitter 18, and an Optical Network Unit (ONU, subscriber termination apparatus) 17, and a plurality of (for example, 32) ONUs 17 are connected to an OSU 15. In the PON 11, since the OSU 15 and an optical fiber 19 between the OSU 15 and the optical splitter 18 are shared by M ONUs 17, the service can be provided at low cost. The L2SW 12 is provided with a large number of ports connected to the PON 11 and a core network 13, and each port on the PON 11 side is connected to one OSU 15 through a line. Since the L2SW 12 is provided with a line concentration function, lines of a number smaller than the number of the lines connected to the port on the PON 11 side are connected to the port on the core network 13 side, and lines from the OSU 15 are concentrated to be connected to the core network 13. When the L2SW 12 receives a down frame from a high-order section, the L2SW 12 reads an identifier (for example, VID (Virtual LAN Identifier)) attached to the frame. Since association of a VID number and an ONU number and corresponding information of the number of a connection destination OSU of each ONU are previously registered in the L2SW 12, the connection destination OSU number of the ONU associated with the corresponding VID number is found from the corresponding information and a received VID number. Since corresponding information between a PON side port number of itself and the connection destination OSU number is also registered in the L2SW 12, a received down frame is output from the corresponding PON side port to transmit the down frame to a desired OSU 15 in accordance with the information. Meanwhile, regarding an up frame from each OSU 15, after the L2SW 12 receives the up frames, the up frames are output from the L2SW 12 to a high-order section in accordance with a transmission order determined by an arbitrary scheduling method. In an example shown in FIG. 23, there is a one-to-one relationship in connection between the port on the PON 11 side of the L2SW 12 and the OSU 15, and since the L2SW 12 is provided with the ports on the PON 11 side having a number that can store a plurality of the OLTs 14, for example, when the maximum number of the OLTs 14 are stored, lines having the same number as the number of all the OSUs 15 stored in the all the OLTs 14 are connected between the L2SW 12 and the OLT 14.

As described above, since the L2SW 12 and the OLT 14 store a large number of users, if service interruption occurs due to failures of the devices, a large number of users are affected thereby. Accordingly, in order to supply service stably, it is important to make devices and paths redundant in preparation for device failure and fiber interruption. Although the L2SW 12 having a larger storable number is relatively often made redundant, it is considered that the importance of making the PON 11 redundant is enhanced, considering future diversification of services and an increase of the storage number in the OLT 14.

In the above description, although the L2SW 12 is externally attached to the OLT 14, the L2SW 12 may be built in the OLT 14. Further, a plurality of the OLTs 14 may share the L2SW 12. (The configuration of FIG. 23 shows that the L2SW 12 is externally attached to the OLT, and a plurality of the OLTs 14 share the L2SW 12.) Furthermore, the L2SW 12 may have a multistage configuration.

To make a portion of or all devices and fibers constituting the PON 11 redundant is referred to as PON protection, and there are various methods corresponding to a redundancy portion and a redundancy method. For example, a method in which the correspondence between a normal system and a redundancy system is N:1, namely a redundancy system (backup) device is provided with respect to N existing (normal system) devices is referred to as an N:1 protection, and the method is proposed in Non-patent Literature 1. The configuration of the N:1 protection is shown in FIG. 24. If the OSU can store up to A ONUs 17, this method uses one OLT 14 storing N normal system OSUs and the redundancy system OSU, A×N or less ONUs 17, and an N×(N+1) optical switch 16 (which is an optical switch in which an arbitrary input/output port of N input/output ports (N side) and an arbitrary input/output port of N+1 input/output ports ((N+1) side) are connected, and there may be an unconnected port). The ONU 17 is connected to each of the N input/output ports on the N side of the optical switch 16 through a PON line 19. The OSU 15 is connected to each of the input/output ports on the (N+1) side of the optical switch 16. Among the OSUs 15, N OSUs are normal systems, and one OSU is a redundancy system. In a normal time, each of the N normal system OSUs 15 communicates with the ONU 17 subordinate to the OSU 15 through the optical switch 16 and each of the N PON lines 19. Meanwhile, since the redundancy system OSU 15 does not establish a path to any of the PON lines through the optical switch 16 in a normal time, the redundancy system OSU 15 does not provide transmission of data to any of the ONUs 17.

When one of the N normal system OSUs 15 is failed, the optical switch 16 switches a path, and a transmission path between the PON line 19 connected to the failed normal system OSU 15 and the redundancy system OSU 15 is established. The ONU 17 in the PON 11 performs ONU registration by the OSU 15 and measures a signal propagation time between the OSU 15 and each ONU 17 before start of data communication, and a link should be established between the OSU 15 and the ONU 17. For example, in a GE-PON (Gigabit Ethernet (registered trademark) PON) system described in Non-Patent Literature 2, an MPCP (Multi Point Control Protocol) frame are transmitted and received between the OSU 15 and the ONU 17 based on a provision of MPCP, whereby a registration/signal propagation time is measured, and, an MPCP link is established between the OSU 15 and the ONU 17. Accordingly, those processes are first required in GE-PON. After the establishment of the MPCP link, the ONU 17 establishes an OAM (Operation, Administration and Maintenance) link with the OSU 15 and exchanges an authentication/encryption key with the OSU 15 through transmission and reception of an OAM frame as a maintenance monitoring signal, and only when all the processes are finished, data communication can be started.

However, since the redundancy system OSU 15 in the system of FIG. 24 does not grasp information of, for example, registration and authentication associated with the ONU 17 subordinate to the failed normal system OSU 15 before switching, the link between the failed normal system OSU 15 and the ONU 17 subordinate to the OSU 15 is cut by the failure of the normal system OSU and path switching performed by the optical switch 16. In the PON system, since data transmission can be started only by establishment of the link and authentication/encryption key exchange between the ONU 17 and the OSU 15, the ONU 17 subordinate to the normal system OSU 15 failed after the path switching establishes the link with the redundancy system OSU 15 and thereafter starts the data transmission.

As described above, even if the normal system OSU 15 is failed, the subordinated ONU 17 can start communication with the redundancy system OSU 15 through the optical switch 16, and therefore, even if the OSU failure occurs, the communication can be recovered by switching in comparison with the case without protection. Further, as a feature, in the N:1 protection, since the cost of the one redundancy system OSU 15 can be shared by all users subordinate to the N normal system OSUs 15, as the value of N is increased to construct the system, additional cost accompanying the protection per the user can be reduced.

As described above, the PON protection is a method for enhancing reliability, and when a normal system device is failed, the normal system device is switched to a redundancy system, whereby communication interruption can be prevented. However, when such switching is performed not only when such a failure occurs but also in a normal time, FW update suppressing the communication interruption of the ONU 17 can be realized. Namely, an arbitrary switching source OSU 15 (for example, the normal system OSU) is switched to a switching destination OSU 15 (for example, the redundancy system OSU) by operation control in a normal time, communication of the ONU 17 subordinate to the corresponding OSU 15 is maintained through the redundancy system OSU 15, and meanwhile, when FW of the switching source OSU 15 is updated, ONU communication interruption corresponding to at least a restart time of the OSU 15 can be suppressed in comparison with the FW update in a system free from the PON protection.

CITATION LIST

Non-Patent Literature

Non-Patent Literature 1: K. Tanaka and Y. Horiuchi, "1: N OLT Redundant Protection Architecture in Ethernet (registered trademark) PON System," OFC NFOEC, pp. 1-6, 2008.

Non-Patent Literature 2: IEEE 802.3ah CSMA/CD Access Method and Physical Layer Specifications Amendment: Media Access Control Parameters, Physical Layers, and Management Parameters for Subscriber Access Networks.

However, in the operation switching, when the link interruption in the ONU 17 occurs as in the above N:1 protection method, the data transmission cannot be restarted quickly, and therefore, there is a problem that the FW update cannot be performed without instantaneous interruption.

SUMMARY

Thus, a first object of the present disclosure is to accelerate an OSU switching operation in which an actually-used OSU 15 is switched to a spare OSU 15 at the time of FW update.

As in the above N:1 protection method, in a method in which at the time when the OSU 15 is failed, when a switching source OSU (usually corresponding to a normal system OSU) is switched to a switching destination OSU (usually corresponding to a redundancy system OSU), the link interruption in an ONU subordinate to the switching source OSU occurs simultaneously with the switching, a link between the switching source OSU and the ONU is required to be established again after path switching, and therefore, there is a problem that data transmission cannot be restarted quickly.

Thus, a second object of the present disclosure is to quickly restart the data transmission after the path switching from the switching source OSU to the switching destination OSU.

Solution to Problem

In order to achieve the above objects, the first disclosure adopts an OSU redundancy configuration in a PON method, and when an actually-used normal system OSU is switched to a redundancy system OSU at the time of FW update, ONU information of OSU accumulated outside the OSU is rapidly reflected on the redundancy system OSU, and, data arrived during switching is accumulated in a buffer, whereby switching without instantaneous interruption can be realized.

In order to achieve the above objects, in the second present disclosure, the ONU information of the OSU is periodically accumulated outside the OSU, whereby the accumulated ONU information is reflected on a spare system OSU when the OSU is failed, and, the switching operation can be more accelerated than that in the prior art by interlocking operation with a concentration switch.

A station-side termination apparatus according to the first disclosure is provided with an OSU, which stores an arbitrary subscriber termination apparatus, receives an up signal from the stored subscriber termination apparatus and, transmits a down signal to the stored subscriber termination apparatus, a concentration switch, which multiplexes the up signals received by the respective OSUs and, outputs the down signal to a storage destination OSU of the subscriber termination apparatus, as a transmission destination of the down signal concerned, and a controller which controls the storage destination OSU of each of the subscriber termination apparatuses, and in the station-side termination apparatus, when the storage destination OSU of the subscriber termination apparatus is switched from a switching source OSU to a switching destination OSU, the controller transmits, to the concentration switch, such a storage destination change instruction that the storage destination OSU of the subscriber termination apparatus is switched, instructs a switching source OSU to stop transmission of a transmission permission message, and notifies information of the subscriber termination apparatus to be stored in the switching destination OSU, whereby the concentration switch performs buffering of the down signal to the subscriber termination apparatus have been stored in the switching source OSU, the switching destination OSU having received information of the subscriber termination apparatus performs setting of the subscriber termination apparatus to be stored therein and completes the setting of the stored subscriber termination apparatus, and at this time, the controller notifies the concentration switch of completion of switching from the switching source OSU to the switching destination OSU, whereby concentration switch outputs the buffered down signal to the switching destination OSU, and, the switching destination OSU notifies the subscriber termination apparatus to be stored therein of restart of transmission.

In the station-side termination apparatus according to the first disclosure, when the concentration switch receives the storage destination change instruction, the concentration switch switches a down buffer addressed to the switching source OSU to a down buffer addressed to the switching destination OSU, accumulates the down signal to be output to the switching destination OSU in the down buffer addressed to the switching destination OSU, notifies the controller of completion of remaining data processing upon completion of output processing of data having been accumulated in the up or down buffer corresponding to the switching source OSU, the switching source OSU stops transmission of the transmission permission message to the subordinated subscriber termination apparatus in accordance with the transmission stop instruction of the transmission permission message and, notifies the controller of completion of the remaining data processing upon completion of the output processing of the up or down signal accumulated in the up or down buffer possessed by itself, and the controller may notify the concentration switch and the switching destination OSU of the switching completion upon reception of the notifications of the completion of each of the remaining data processing from both the concentration switch and the switching source OSU and completion of setting of the subscriber termination apparatus performed by the switching destination OSU.

The station-side termination apparatus according to the first disclosure is further provided with an optical switch controlling a connection state between each subscriber termination apparatus and each OSU to switch the subscriber termination apparatus stored in each OSU, and when the storage destination OSU of the subscriber termination apparatus is switched from the switching source OSU to the switching destination OSU, the controller transmits, to the concentration switch, such a storage destination change instruction that the storage destination OSU of the subscriber termination apparatus is switched, instructs the switching source OSU to stop transmission of the transmission permission message, notifies the switching destination OSU of the information of the subscriber termination apparatus to be stored in the switching destination OSU, and, notifies the optical switch of the information of the switching destination OSU and the subscriber termination apparatus stored in the switching destination OSU concerned, whereby the concentration switch performs buffering of the down signal to the subscriber termination apparatus having been stored in the switching source OSU and performs setting of the subscriber termination apparatus stored in the switching destination OSU having received the information of the subscriber termination apparatus, the optical switch connects the notified subscriber termination apparatus to the switching destination OSU, and after setting of the subscriber termination apparatus stored in the switching destination OSU is completed by the switching destination OSU and after connection between the notified subscriber termination apparatus and the switching destination OSU is completed by the optical switch, the controller notifies the concentration switch of the completion of the switching from the switching source OSU to the switching destination OSU, whereby the concentration switch outputs the buffered down signal to the switching destination OSU, and, the switching destination OSU may notify the subscriber termination apparatus stored in the switching destination OSU of restart of transmission.

In the station-side termination apparatus according to the first disclosure, the information of the subscriber termination apparatus stored in the switching destination OSU is notified to the optical switch, and the optical switch connects the notified subscriber termination apparatus to the switching destination OSU, whereby the controller transmits the storage destination change instruction to the concentration switch, instructs the switching source OSU to stop transmission of the transmission permission message, and may notify the switching destination OSU of the information of the subscriber termination apparatus stored therein.

An optical network system according to the first disclosure is provided with the station-side termination apparatus according to the present disclosure and the subscriber termination apparatus.

In a method of switching the OSU of the station-side termination apparatus according to the first disclosure, the station-side termination apparatus is provided with an OSU, which stores an arbitrary subscriber termination apparatus, receives an up signal from the stored subscriber termination apparatus and, transmits a down signal to the stored subscriber termination apparatus, a concentration switch, which multiplexes the up signals received by the respective OSUs and, outputs the down signal to a storage destination OSU of the subscriber termination apparatus as a transmission destination of the down signal concerned, and a controller which controls the storage destination OSU of each of the subscriber termination apparatuses, the OSU switching method includes an OSU switching procedure in which the controller transmits, to the concentration switch, such a storage destination change instruction that the storage destination OSU of the subscriber termination apparatus is switched, instructs the switching source OSU to stop transmission of the transmission permission message, and, notifies the information of the subscriber termination apparatus to be stored in the switching destination OSU, whereby the concentration switch performs buffering of the down signal to the subscriber termination apparatus having been stored in the switching source OSU, and, the switching destination OSU having received the information of the subscriber termination apparatus performs setting of the subscriber termination apparatus to be stored therein and a data transmission start procedure in which after the switching destination OSU completes the setting of the subscriber termination apparatus to be stored therein, the controller notifies the concentration switch and the switching destination OSU of completion of switching from the switching source OSU to the switching destination OSU, whereby the concentration switch outputs the buffered down signal to the switching destination OSU, and, the switching destination OSU notifies the subscriber termination apparatus to be stored therein of restart of transmission.

In the OSU switching method in the station-side termination apparatus according to the first disclosure, in the OSU switching procedure, when the concentration switch receives the storage destination change instruction, the concentration switch switches a down buffer addressed to the switching source OSU to a down buffer addressed to the switching destination OSU, accumulates the down signal to be output to the switching destination OSU in the down buffer addressed to the switching destination OSU, notifies the controller of completion of remaining data processing upon completion of output processing of data having been accumulated in the up or down buffer corresponding to the switching source OSU, the switching source OSU stops transmission of the transmission permission message to the subordinated subscriber termination apparatus in accordance with the transmission stop instruction of the transmission permission message, and, notifies the controller of completion of the remaining data processing upon completion of the output processing of the up or down signal accumulated in the up or down buffer possessed by itself, and in the data transmission start procedure, the controller may notify the concentration switch and the switching destination OSU of the switching completion upon reception the completion of the remaining data processing from both the concentration switch and the switching source OSU and completion of setting of the subscriber termination apparatus performed by the switching destination OSU.

In the OSU switching method in the station-side termination apparatus according to the first disclosure, in the OSU switching procedure, the controller transmits, to the concentration switch, such a storage destination change instruction that the storage destination OSU of the subscriber termination apparatus is switched, instructs the switching source OSU to stop the transmission of the transmission permission message, notifies the switching destination OSU of the information of the subscriber termination apparatus to be stored in the switching destination OSU, and, notifies the optical switch of the information of the switching destination OSU and the subscriber termination apparatus to be stored in the switching destination OSU concerned, whereby the concentration switch performs buffering of the down signal to the subscriber termination apparatus having been stored in the switching source OSU, the switching destination OSU having received the information of the subscriber termination apparatus performs setting of the subscriber termination apparatus to be stored therein, the optical switch connects the notified subscriber termination apparatus to the switching destination OSU, in the data transmission start procedure, when the switching destination OSU completes the setting of the subscriber termination apparatus to be stored therein and when the optical switch completes the connection between the notified subscriber termination apparatus and the switching destination OSU, the controller notifies the concentration switch of the completion of switching from the switching source OSU to the switching destination OSU, whereby the concentration switch outputs the buffered down signal to the switching destination OSU, and, the switching destination OSU may notify the subscriber termination apparatus to be stored therein of restart of transmission.

In the OSU switching method in the station-side termination apparatus according to the first disclosure, in the OSU switching procedure, the information of the subscriber termination apparatus stored in the switching destination OSU is notified to the optical switch, and the optical switch connects the notified subscriber termination apparatus to the switching destination OSU, whereby the controller transmits the storage destination change instruction to the concentration switch, instructs the switching source OSU to stop transmission of the transmission permission message, and, may notify the switching destination OSU of the information of the subscriber termination apparatus stored in the switching destination OSU.

The station-side termination apparatus according to the second disclosure is provided with a switching source OSU, which receives an up signal from a subscriber termination apparatus and, transmits an input down signal to the subscriber termination apparatus, a switching destination OSU which, instead of any of the switching source OSUs, receives the up signal from the subscriber termination apparatus and, transmits the down signal to the subscriber termination apparatus, a concentration switch, which multiplexes the up signals received by the switching source OSU and the switching destination OSU and, separates the down signals for each predetermined data to output the down signals to either the switching source OSU or the switching destination OSU, and a controller which detects a failure of the switching source OSU and controls the operation of the switching source OSU, the switching destination OSU, and the concentration switch corresponding to the presence or absence of the failure, wherein in such a state that the controller does not detect the failure of the switching source OSU, the controller reads the information relating to control, management, or registration of the subscriber termination apparatus of each of the switching source OSUs periodically or at the time of updating the information and accumulates the information, the controller monitors the switching source OSU, in such a state that the controller detects the failure of the switching source OSU, the controller issues, to the concentration switch, such a storage destination change instruction that a storage destination of the down signal is changed from the switching source OSU to the switching destination OSU, the concentration switch switches the storage destination of the down signal in accordance with the storage destination change instruction and, accumulates the down signal addressed to the switching destination in a down buffer, the controller writes the accumulated information about the failed OSU in the switching destination OSU, the switching destination OSU notifies the controller of completion of reflection after completion of setting of the information, the controller issues a transmission instruction to the switching destination OSU based on the reflection completion notification, the switching destination OSU starts transmission and reception with the subscriber termination apparatus based on the transmission instruction, the controller notifies the concentration switch of the completion of switching based on the reflection completion notification, and the concentration switch transmits the down signal accumulated in the down buffer to the switching destination OSU based on the switching completion notification and then transmits the down signal to be input to the concentration switch.

In the station-side termination apparatus of the second disclosure, N (N is a natural number) switching source OSUs are provided, one switching destination OSU is provided, the optical switch has an optical input/output port of a first group consisting of N optical input/output ports and an optical input/output port of a second group consisting of N+1 optical input/output ports, each of the optical input/output ports of the first group is connected to the subscriber termination apparatus side, each of the optical input/output ports of the second group is connected to the switching source OSU side or the switching destination OSU side, and arbitrary one of the optical input/output ports of the first group may be connectable to arbitrary one of the optical input/output ports of the second group based on instruction from outside.

In the station-side termination apparatus of the second disclosure, N (N is a natural number) switching source OSUs are provided, one switching destination OSU is provided, the optical switch has an optical input/output port of a first group consisting of N optical input/output ports, an optical input/output port of a second group consisting of one optical input/output port, and N B-to-2 optical splitters (B is an arbitrary natural number), one side of the B-to-2 optical splitters branched into two is connected to each of the optical input/output port of the first group, the other branched side is connected to each of the switching source OSU, the optical input/output ports of the second group is connected to the switching destination OSU side, and the optical input/output port of the second group may be connectable to arbitrary one of the optical input/output ports of the first group based on instruction from outside.

An optical network system according to the second disclosure is provided with the station-side termination apparatus according to the present disclosure and the subscriber termination apparatus.

In the optical network system of the second disclosure, in a case where the controller detects a failure of the switching source OSU, when the subscriber termination apparatus detects a down signal interruption from the switching source OSU, the subscriber termination apparatus accumulates an up signal input to the subscriber termination apparatus in an upper buffer, when the subscriber termination apparatus detects switching from the switching source OSU to the switching destination OSU, the subscriber termination apparatus starts communication with the switching destination OSU after the switching, using information relating to control, management, or registration before the switching, and the subscriber termination apparatus may transmit the up signal accumulated in the up buffer to the switching destination OSU and then transmit the up signal to be input to the subscriber termination apparatus.

In a method of switching the OSU of the station-side termination apparatus according to the second disclosure, the station-side termination apparatus is provided with a switching source OSU, which receives an up signal from a subscriber termination apparatus and, transmits an input down signal to the subscriber termination apparatus, a switching destination OSU which, instead of any of the switching source OSUs, receives an up signal from the subscriber termination apparatus and, transmits a down signal to the subscriber termination apparatus, a concentration switch, which multiplexes the up signals received by the switching source OSU and the switching destination OSU and, separates the down signal for each predetermined data to output the down signal to either the switching source OSU or the switching destination OSU, this method includes in sequence a monitoring procedure in which a signal is transmitted and received between the switching source OSU and the subscriber termination apparatus, the information relating to control, management, and registration of the subscriber termination apparatus possessed by each of the switching source OSUs is read out periodically or at the time of updating the information and accumulated, and, the switching source OSU is monitored, an OSU switching procedure in which the information about the failed switching source OSU that is accumulated in the monitoring procedure is set to the switching destination OSU, and, the concentration switch switches the storage destination of the down signal from the failed switching source OSU to the switching destination OSU and, accumulates the down signal addressed to the switching destination in a down buffer, and a data transmission start procedure in which the switching destination OSU starts transmission and reception with the subscriber termination apparatus, and the concentration switch transmits the down signal accumulated in the down buffer to the switching destination OSU and then transmits the down signal to be input to the concentration switch.

In the OSU switching method in the station-side termination apparatus of the second disclosure, in the OSU switching procedure, the subscriber termination apparatus accumulates an input up signal, and in the data transmission start procedure, the subscriber termination apparatus starts communication with the switching destination OSU after switching, using the information relating to control, management, or registration before switching from the switching source OSU to the switching destination OSU and may transmit the up signal accumulated in the OSU switching procedure and then transmit a newly input up signal.

The above respective disclosures can be combined wherever possible.

In the first disclosure, the ONU information possessed by each OSU is periodically accumulated outside the OSU, the accumulated ONU information is reflected on a spare system OSU when the OSU is switched by operation control, and, the switching operation can be accelerated by interlocking operation with the concentration switch. Further, in the first disclosure, with the occurrence of the switching, the down data addressed to the ONU subordinate to the switching source OSU arrived at the OLT is accumulated in a buffer of the concentration switch in the OLT until completion of switching, whereby the down frame loss can be prevented. Similarly, in the first disclosure, with the occurrence of switching, the up data from the ONU subordinate to a failed OSU during switching is accumulated in a buffer in the ONU until completion of switching, whereby the up frame loss can be prevented.

Further, in the first disclosure, until immediately after the occurrence of switching, all the down data addressed to the ONU subordinate to the switching source OSU that are accumulated in buffers of the switching source OSU and the concentration switch are transmitted to the corresponding ONU, and then a path is switched, or all the down data addressed to the ONU subordinate to the switching source OSU are transmitted to the corresponding ONU after switching of the path is previously performed, whereby the OSU switching can be performed without instantaneous interruption.

In the second disclosure, in the switching following the OSU failure, the ONU information possessed by each OSU is periodically accumulated outside the OSU, the accumulated ONU information is reflected on a spare system OSU when an OSU is failed, and, data transmission can be restarted quickly by interlocking operation with the concentration switch.

Further, in the second disclosure, with the occurrence of switching, the down data addressed to the ONU subordinate to a failed OSU that is arrived at the OLT is accumulated in a buffer of the concentration switch in the OLT until completion of the switching, whereby the down frame loss can be suppressed. Similarly, in the second disclosure, with the occurrence of switching, the up data from the ONU subordinate to a failed OSU during switching is accumulated in a buffer in the ONU until completion of the switching, whereby the up frame loss can be suppressed.

BRIEF DESCRIPTION OF THE DRAWINGS

FIG. 5 shows an example of a management table of a controller according to Embodiment 2 of the first disclosure;

FIG. 7 shows an example of a management table after OSU switching;

FIG. 18 shows an example of a management table of a controller according to Embodiment 3 of the second disclosure;

FIG. 20 shows an example of a management table after OSU switching;

DETAILED DESCRIPTION OF THE PREFERRED EMBODIMENT

Figure 1:
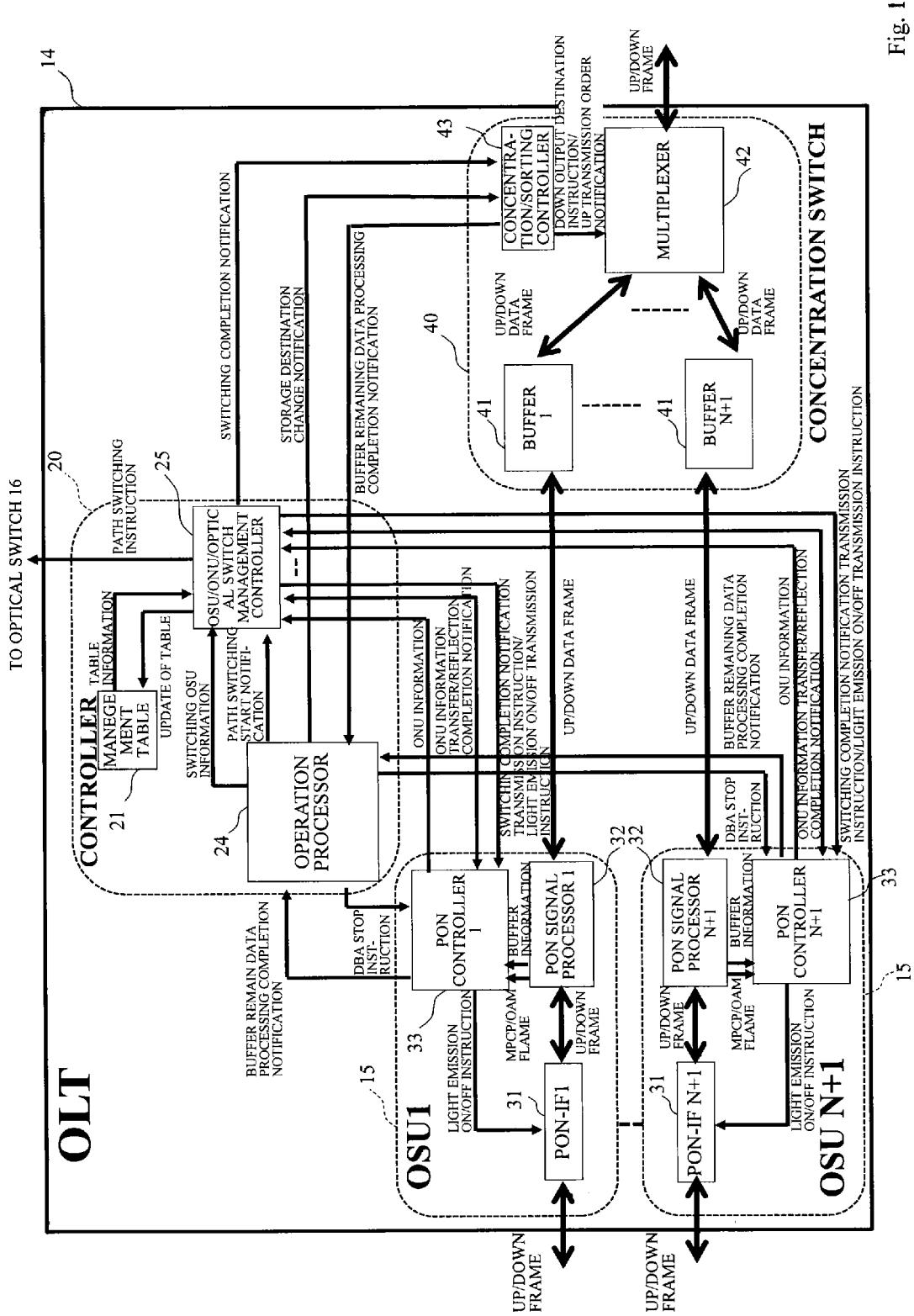
FIG. 1 shows a schematic configuration of an OLT provided in an optical network according to Embodiment 1 of a first disclosure.

Embodiments of the present disclosure will be described with reference to the accompanying drawings. The embodiments to be described hereinafter are examples of the present disclosure, and the disclosure is not limited to the following embodiments. Components denoted by the same reference numerals in the present specification and the drawings mutually denote the same components.

Embodiment 1 of First Disclosure

FIG. 1 shows a schematic configuration of an OLT provided in an optical network according to Embodiment 1 of the first disclosure. An OLT 14 according to Embodiment 1 is provided with (N+1) OSUs 15, a controller 20 for switching control, and a concentration switch 40. Each OSU 15 is provided with a PON-IF 31, a PON signal processor 32, and a PON controller 33, the controller 20 is provided with an OSU/ONU/optical switch management controller 25, an operation processor 24, and a management table 21, and the concentration switch 40 is provided with a concentration/sorting controller 43, a multiplexer 42, and (N+1) buffers 41. The buffer 41 is provided with an up buffer and a down buffer. Other configurations unnecessary for the description will be omitted.

The OLT 14 in this constitution is assumed to be applied in a PON protection system with the redundant OSU 15 using an optical switch 16, and as the object, when FW of the OSU 15 is updated in such a system, the connection destination of the ONU 17 subordinate to the corresponding OSU 15 is switched to the redundancy system OSU 15 without instantaneous interruption, the FW of the corresponding OSU 15 is updated during the switching, and after the update is completed, the connection destination of the ONU 17 is switched back without instantaneous interruption. Although description and illustration are omitted, in the PON protection system applying the OLT 14, it is certainly possible to correspond to an OSU failure as an original object of the PON protection owing to the operation of function blocks and so on other than the above constituents.

As long as the PON protection system is a system in which the OSU 15 is made redundant, the OLT 14 in this constitution is applicable to the PON protection system even when the optical switch 16 is not used. In the system in both the cases, in the OLT 14 in this constitution, when the FW of the OSU 15 is updated, the connection destination OSU 15 of the ONU 17 subordinate to the corresponding OSU 15 is switched to the redundancy system OSU 15 without instantaneous interruption, the FW of the corresponding OSU 15 is updated during the switching, and after the update is completed, the connection destination OSU 15 of the ONU 17 is switched back without instantaneous interruption.

The optical switch 16 is provided with input/output ports on the OSU 15 side and input/output ports on the ONU 17 side, and the input/output ports on the OSU 15 side are connected to the OSU 15 through optical fibers, and the input/output ports on the ONU 17 side are connected to the ONU 17 through optical fibers 19 (moreover, optical splitters 18).

Hereinafter, the operation of each function block of the OLT 14 will be described.

PON-IF 31 receives an up frame of an optical signal from the ONU 17 connected to the corresponding PON-IF 31 or a down frame of an electrical signal from the PON signal processor 32 to convert the frame into an electric signal or an optical signal, and, thus, to output the signal to the PON signal processor 32 or outside the PON-IF 31 (ONU 17 side). The PON-IF 31 further receives a light emission ON/OFF instruction from the PON controller 33 to stop light emission from a light emitting state in accordance with the instruction or starts light emission from a light emission stop state.

The PON signal processor 32 receives the up frame of the electrical signal from the PON-IF 31, when the up frame is data frame, the PON signal processor 32 outputs the data frame to the buffer 41 of the concentration switch 40, and when the up frame is a frame other than the data frame (MPCP frame or OAM frame), the PON signal processor 32 outputs the frame to the PON controller 33 and, receives electrical down data frame from the buffer 41 of the concentration switch 40 to output the down data frame to the PON-IF 31. Further, the PON signal processor 32 notifies the PON controller 33 of a data accumulation amount of the buffer possessed by itself periodically or every time instruction is issued from the PON controller 33.

The PON controller 33 receives an MPCP/OAM frame from the PON signal processor 32 and performs control necessary for data communication with the ONU 17, such as registration management and uplink band allocation of the ONU 17 subordinate to the corresponding OSU 15 in accordance with the contents and outputs information (referred to as ONU information) relating to the corresponding ONU 17, managed and grasped by the PON controller 33 based on the control, to an OSU/ONU/optical switch management controller 25 of the controller 20 periodically or for each update of the information. Further, the PON controller 33 receives data accumulation information of a buffer from the PON signal processor 32, and as a result, when it is found that accumulated data is zero, the PON controller 33 can notify the operation processor 24 of the controller 20 of a notification of completion of processing of remaining data of the buffer (buffer remaining data processing completion notification). When the ONU information is transferred from the OSU/ONU/optical switch management controller 25 of the controller 20, the PON controller 33 receives the ONU information and, updates the managed and grasped ONU information by that time to follow the contents of the received ONU information, and when the update of the information is completed, the PON controller 33 outputs an ONU information reflection completion notification to the OSU/ONU/optical switch management controller 25. When the PON controller 33 receives a DBA stop instruction from the operation processor 24, transmission of a Gate message to the subordinated ONU 17 is stopped.

When a switching completion notification transmission instruction is sent from the OSU/ONU/optical switch management controller 25, the PON controller 33 receives the instruction to output the instruction to the ONU 17. Further, the PON controller 33 receives a light emission ON/OFF transmission instruction from the OSU/ONU/optical switch management controller 25, when the instruction is the light emission ON transmission instruction, the PON controller 33 outputs a light emission instruction to the PON-IF 31, and when the instruction is the light emission OFF transmission instruction, the PON controller 33 outputs a light emission OFF instruction to the PON-IF 31.

The OSU/ONU/optical switch management controller 25 receives the ONU information from the PON controller 33 and information (switching OSU information) relating to the switching source OSU 15 and the switching destination OSU 15 from the operation processor 24 and outputs a table update instruction to the management table 21 so that the table is updated to follow the contents of the information. Furthermore, the OSU/ONU/optical switch management controller 25 acquires the ONU information relating to the ONU 17 subordinate to the switching source OSU 15 from the management table 21, transfers the ONU information to the switching destination OSU 15, and, receives the ONU information reflection completion notification from the switching destination OSU 15. When the OSU/ONU/optical switch management controller 25 receives such a notification that path switching performed by the optical switch 16 is started from the operation processor 24, the OSU/ONU/optical switch management controller 25 immediately outputs a path switching instruction to the optical switch 16 to switch the corresponding path. The OSU/ONU/optical switch management controller 25 outputs the switching completion notification to a concentration/sorting controller 43 of the concentration switch 40 in a timing at which the ONU information reflection completion notification is received from the switching destination OSU 15 and in a timing at which the path switching is finished by the optical switch 16.

When the OSU/ONU/optical switch management controller 25 receives a notification of completion of the path switching from the optical switch 16, the notification can be transferred to the operation processor 24.

Immediately after input of a command according to an operation of designating the switching source OSU 15 and the switching destination OSU 15, the operation processor 24 outputs a storage destination change notification to the concentration/sorting controller 43 of the concentration switch 40 and outputs the DBA stop instruction to the PON controller 33. Further, the operation processor 24 outputs switching OSU information following the contents of the input command to the OSU/ONU/optical switch management controller 25. Furthermore, the operation processor 24 outputs the path switching start notification to the OSU/ONU/optical switch management controller 25 immediately after receiving both the buffer remaining data processing completion notification from the PON controller 33 and the similar buffer remaining data processing completion notification from the concentration/sorting controller 43 of the concentration switch 40.

After the input of the operation command, the operation processor 24 can output the path switching start notification to the OSU/ONU/optical switch management controller 25, and furthermore when the operation processor 24 receives such a notification that the path switching performed by the optical switch 16 is completed from the OSU/ONU/optical switch management controller 25, the operation processor 24 outputs the storage destination change notification to the concentration/sorting controller 43 of the concentration switch 40 and can output the DBA stop instruction to the PON controller 33.

Regarding all the ONUs 17 subordinate to the OLT 14, the ONU information of each ONU 17 is described in detail in the management table 21, and a connection destination OSU number for each ONU 17, a connection destination concentration switch port number, a connection destination optical switch input/output side port number, a VID number and so on are described in the management table 21. Accordingly, the controller 20 can grasp in detail physical connection situations and registration/management information of all the ONUs 17 and all the OSUs 15 through the management table 21. When the management table 21 receives the table update instruction from the OSU/ONU/optical switch management controller 25, the management table 21 is updated following the contents.

The concentration/sorting controller 43 has association of a VID number and an ONU number and information of connection destination OSU number of each ONU 17 and a concentration switch port number, these information being previously registered through the controller 20, and the concentration/sorting controller 43 instructs the multiplexer 42 the corresponding output destination buffer 41 of the down frame received by the multiplexer 42 in accordance with these information. When the concentration/sorting controller 43 receives the storage destination change notification from the operation processor 24, the concentration/sorting controller 43 changes the connection destination OSU number information of the corresponding ONU 17 registered in itself so that the information follows the contents of the notification and, stops the output of the down frame from the buffer 41 corresponding to the switching destination OSU 15. Further, the concentration/sorting controller 43 determines a transmission order of the up frames accumulated in the respective buffers 41 according to an arbitrary scheduling method previously set in itself and notifies the multiplexer 42 of the determined transmission order. Furthermore, the concentration/sorting controller 43 grasps the data accumulation amount of each buffer 41 in the concentration switch 40, and when the remaining data of arbitrary buffer 41 is zero, the concentration/sorting controller 43 outputs the buffer remaining data processing completion notification, which is used for notifying the fact that the remaining data of the arbitrary buffer 41 is zero, to the operation processor 24. When the concentration/sorting controller 43 receives the switching completion notification from the OSU/ONU/optical switch management controller 25, the concentration/sorting controller 43 allows the corresponding buffer 41 having stopped the output of the down frame to output the down frame.

The multiplexer 42 receives the down data frame from a section at a higher order than the OLT 14 and separates the down data frame for each predetermined data to output the separated data frames to the corresponding buffer 41 in accordance with the VID number of the received frame and the instruction from the concentration/sorting controller 43, instructs the output of the corresponding up frame to the corresponding buffer 41 in accordance with the transmission order notified from the concentration/sorting controller 43, and receives the up frames from the buffers 41 to output the up frames to the higher order in sequence.

The buffer 41 receives and accumulates the up data frames from the corresponding PON signal processor 32 and outputs the up data frames in sequence to the multiplexer 42 in accordance with the instruction from the multiplexer 42. Meanwhile, the buffer 41 receives and accumulates the down data frames from the multiplexer 42, and outputs the down data frames in sequence to the corresponding PON signal processor 32 in accordance with the instruction from the multiplexer 42. Furthermore the buffer 41 can stop and start the output of the up/down frames in accordance with an output stop/output permission instruction from the concentration/sorting controller 43.

When the OLT 14 constituted of the function blocks performing the above operations is applied to a system of the PON protection using the optical switch 16, the FW of the OSU 15 can be updated without instantaneous interruption.

An OSU switching method of an optical network system and an OSU switching method in a station-side termination apparatus according to the present embodiment have a monitoring procedure, an OSU switching procedure, and a data transmission start procedure in this order. In a normal time, the monitoring procedure is performed. When the switching source OSU 15 is failed, the data transmission start procedure is performed after the OSU switching procedure in which the OSU is switched.

Figure 2:
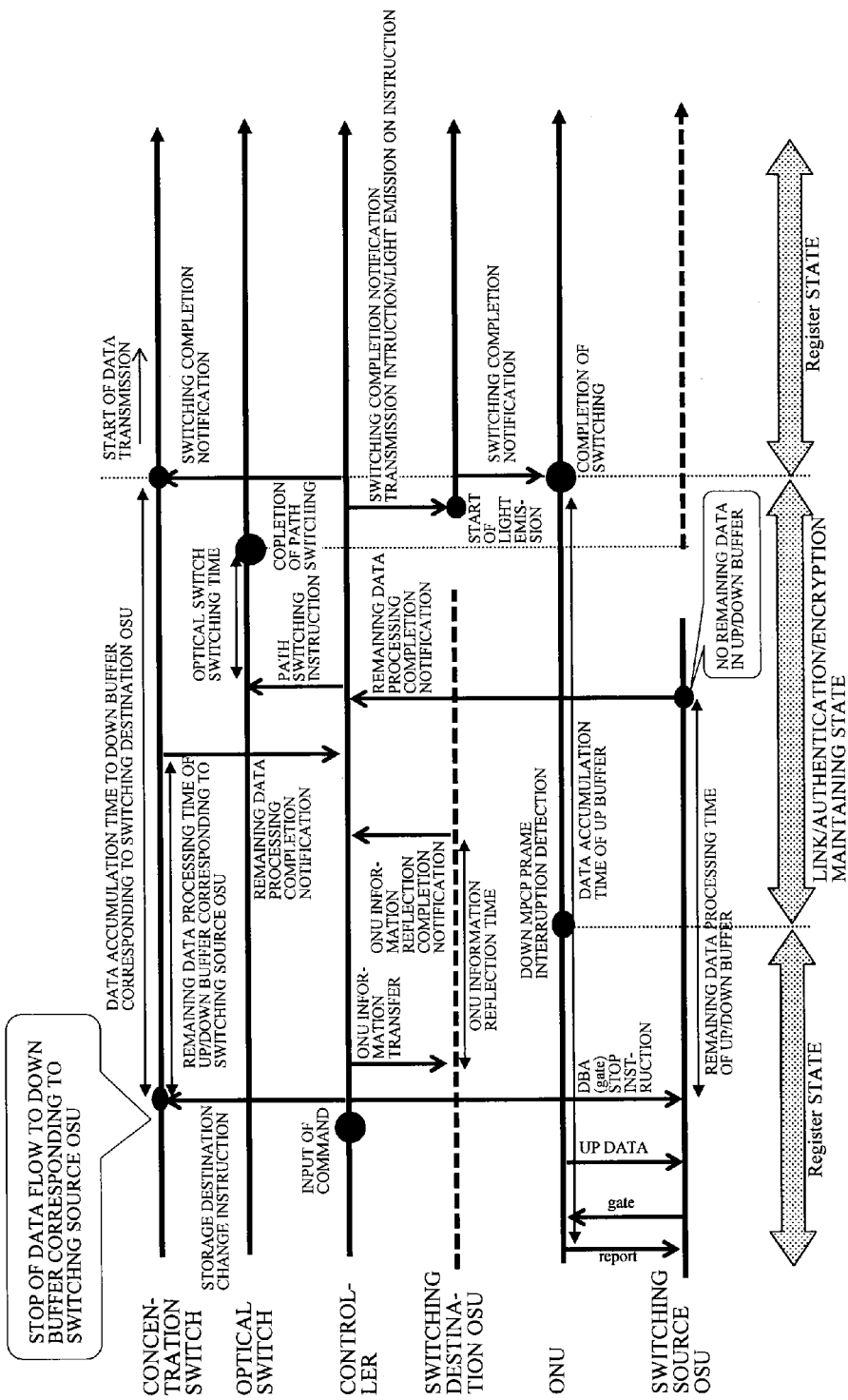
FIG. 2 shows an example of a first switching sequence triggered by operation according to Embodiment 1 of the first disclosure.

FIG. 2 shows a switching sequence triggered by operation in a PON system using the OLT 14 and the optical switch 16. In this drawing, based on a temporal axis of each element of the concentration switch 40, the optical switch 16, the controller 20, the switching destination OSU 15, the ONU 17, and the switching source OSU 15, points on the temporal axis show occurrence and termination of elements (such as input of switching command and completion of switching), and arrows connecting elements show exchange of messages and information. Thin arrows in both directions represent states and operation time, and thick arrows in both directions represent the state of the ONU 17. It is assumed that in order to prevent output light from the switching destination OSU 15 from colliding with output light from the switching source OSU 15 in a stage before switching, the switching destination OSU 15 does not establish a transmission path with the ONU 17 subordinate to the switching source OSU 15 in a normal time before switching, or a transmitter of the switching destination OSU 15 is in a light emission OFF state. This sequence diagram assumes the latter case.

In a normal time, the switching source OSU 15 performs data communication with the subordinated ONU 17, and the up data from the ONU 17 is transmitted to the OSU 15 based on band allocation to the ONU 17 performed by the OSU 15. For example, in DBA (Dynamic Bandwidth Allocation), a report message requiring the OSU 15 to permit transmission of the up data and a gate message instructing transmission time and transmission data amount to the ONU 17 are exchanged between the OSU 15 and the ONU 17, and the up data from each ONU 17 is transmitted to the OSU 15 through the exchange of the messages without colliding with the optical splitter 18 and a common fiber. In order to perform switching by operation under the up communication control, when a switching command clearly shown about the switching source OSU 15 and the switching destination OSU 15 is input to the controller 20, the controller 20 immediately transmits, to the concentration switch 40, such a storage destination change instruction that the storage destination OSU 15 of the VID number associated with the ONU 17 subordinate to the switching source OSU 15 is changed from the switching source OSU 15 to the switching destination OSU 15 and, transmits the DBA stop instruction (gate transmission stop) to the corresponding switching source OSU 15.

The concentration switch 40 having received the storage destination change notification changes the buffer 41 in which the down frame addressed to the ONU 17 subordinate to the switching source OSU 15 is accumulated from the buffer 41 (switching source down buffer) corresponded to the switching source OSU 15 to the buffer 41 (switching destination down buffer) corresponded to the switching destination OSU and starts accumulation of the down frame addressed to the corresponding ONU 17 in the switching destination down buffer. According to this constitution, the accumulation of the down frame addressed to the corresponding ONU 17 from a high-order section in the switching source down buffer is stopped, and occurrence of loss of the down frame addressed to the corresponding ONU 17 and arrived at the concentration switch 40 from a high-order section during switching can be avoided. The down frame addressed to the corresponding ONU 17 is continued to be accumulated in the switching destination down buffer without being output until the controller issues an instruction (switching completion notification). In the up/down frames already accumulated in the switching source up/down buffers, transmission processing is continued through the concentration/sorting controller 43 until the remaining data of them is zero, whereby a frame loss in the switching source up/down buffers does not occur. When the remaining data of the switching source up/down buffers is zero, the concentration switch 40 transmits, to the controller 20, a remaining data processing completion notification message for notifying the fact that the remaining data processing in the corresponding buffer 41 is completed.

Since the switching source OSU 15 having received the DBA stop instruction stops gate transmission to the subordinated ONU 17, the switching source OSU 15 does not receive new up data except for the up data to the gate having transmitted. In the down data from the concentration switch 40, since the switching source down buffer does not receive new down data according to the storage destination change instruction, only down data accumulated before reception of the storage destination change instruction is transmitted to the switching source OSU 15. Accordingly, the switching source OSU 15 does not receive new down data except for the down data. As described above, since new up/down data does not arrive at the switching source OSU 15 during switching, processing of the up/down data other than the new up/down data and data accumulated in the up/down buffer of the switching source OSU 15 before reception of the DBA stop instruction is continued after reception of the DBA stop instruction, whereby the frame loss in the buffer of the switching source OSU 15 does not occur. The processing of those remaining data is completed, and when the remaining data of the up/down buffers of the switching source OSU 15 is zero, the switching source OSU 15 transmits the remaining data processing completion notification message to the controller 20.

Although the ONU 17 subordinate to the switching source OSU 15 detects MPCP frame interruption after receiving the DBA stop instruction of the switching source OSU 15, if the ONU 17 used in this system detects the MPCP frame interruption in a registered state, for example, link interruption does not immediately occur, and the ONU 17 has a function of transiting a state from the register state to a state in which link, authentication, and encryption are maintained. The state transition function is used for preventing the link interruption in the ONU 17 and eliminating reconnection operation of, for example, a link between the ONU 17 and the switching destination OSU 15 after switching and namely is one of functions of realizing switching without instantaneous interruption.

The controller 20 transfers the ONU information about the ONU 17 subordinate to the switching source OSU 15, which is described in the management table 21 after transmitting the storage destination change instruction and the DBA stop instruction to the switching destination OSU 15. The switching destination OSU 15 having received the ONU information performs a registration setting following the contents of the ONU information, and when the setting is completed, the switching destination OSU 15 transmits the ONU information reflection completion notification to the controller 20. Once the remaining data processing completion notifications from both the concentration switch 40 and the switching source OSU 15 are received, the connection destination OSU 15 of the ONU 17 subordinate to the switching source OSU 15 is changed to the switching destination OSU 15, and therefore, a path switching instruction is issued to the optical switch 16 so that a connection destination of input and output of the optical switch 16 is switched to the corresponding path in accordance with the management table 21. The optical switch 16 receives the instruction to perform path switching.

Next, the data transmission start procedure to be hereinafter described is performed.

The controller 20 transmits the path switching instruction and thereafter notifies the switching destination OSU 15 of the switching completion notification transmission instruction and the light emission ON instruction when the path switching in the optical switch 16 is finished. Here, upon completion of the path switching, when the optical switch 16 can notify the fact that the path switching is completed to the controller 20, there is considered a method of notifying the switching destination OSU 15 of a switching completion notification transmission instruction after the controller 20 receives the notification. Hereinafter, there will be considered only a method of performing notification when the path switching in the optical switch 16 is finished. The switching destination OSU 15 having received the instruction transmits such a switching completion notification that switching is completed to the ONU 17 newly incorporated to be subordinate to the switching destination OSU 15 by the path switching and, changes the light emission OFF state of itself to the light emission ON state to start light emission.

When the ONU 17 in the link/authentication/encryption maintaining state receives the switching completion notification, the ONU 17 immediately returns to the registered state and can perform data communication with the switching destination OSU 15.

The controller 20 transmits the switching completion notification transmission instruction to the switching destination OSU 15 and thereafter transmits the switching completion notification to the concentration switch 40, and the concentration switch 40 having received the notification starts to transmit the down data addressed to the corresponding ONU 17 and accumulated in the switching destination buffer 41.

By virtue of such a switching sequence triggered by the above operation, even if the down frame addressed to the ONU 17 subordinate to the switching source OSU 15 arrives at the concentration switch 40 of the OLT 14 during switching, a loss of the frames can be avoided. In the switching source up/down buffer of the concentration switch 40 and the up/down buffer of the switching source OSU 15, since the switching is completed when data accumulated before switching or immediately after start of switching is completely processed, a loss of the buffer does not occur with switching. Accordingly, the OSU switching can be performed without instantaneous interruption, and namely FW update can be performed without instantaneous interruption.

Figure 3:
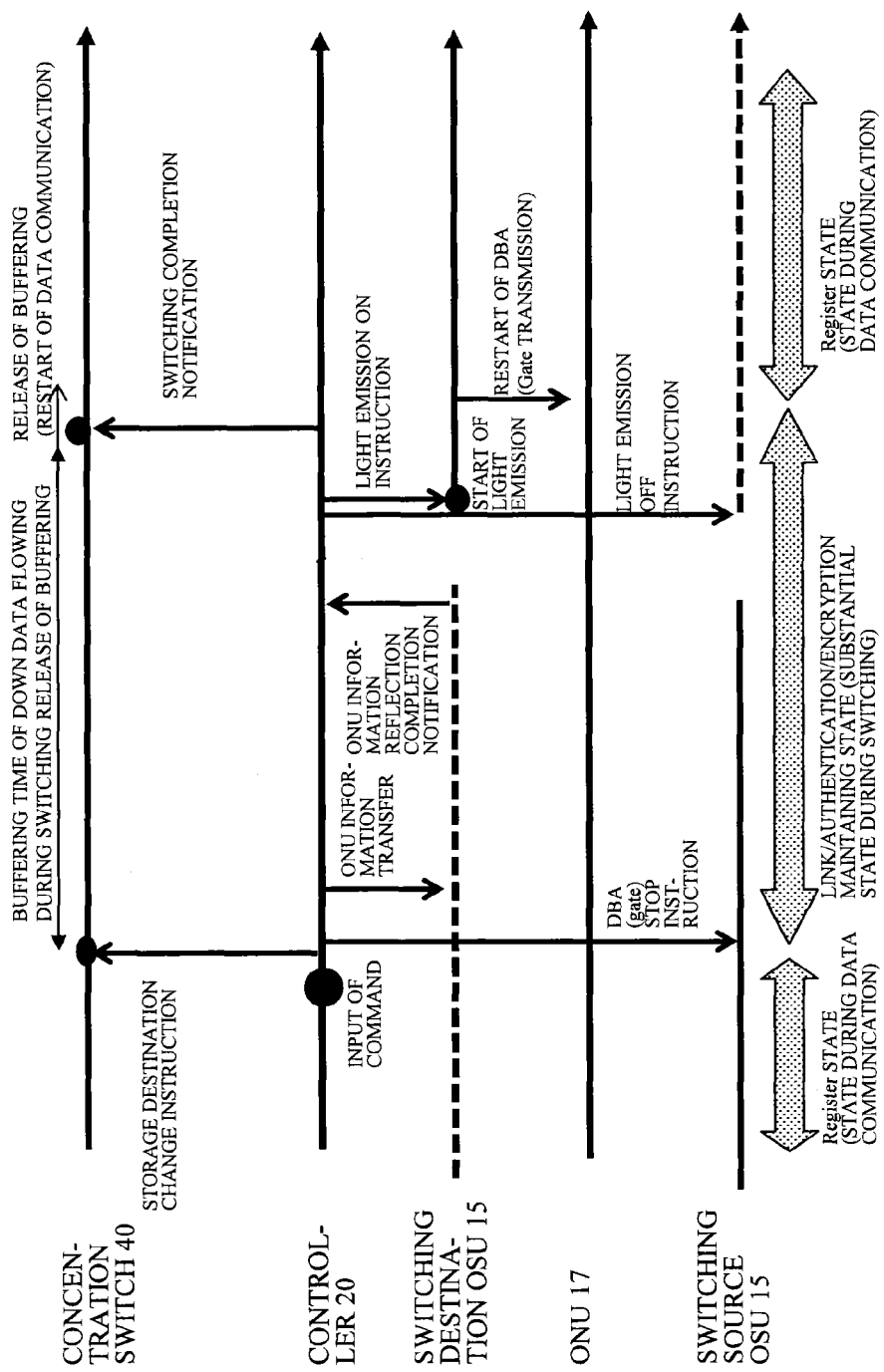
FIG. 3 shows an example of a second switching sequence triggered by operation according to Embodiment 1 of the first disclosure.

FIG. 3 shows a second example of a switching sequence triggered by operation when the OLT 14 in this constitution is applied to a PON protection system in which the OSU 15 is made redundant without using the optical switch 16. In this example, based on a temporal axis of each element of the concentration switch 40, the controller 20, the switching destination OSU 15, the ONU 17, and the switching source OSU 15, points on the temporal axis show occurrence and termination of elements (such as input of a switching command and completion of switching), and arrows connecting elements show exchange of messages and information.

In the OSU switching procedure, the controller 20 transmits, to the concentration switch 40, such a storage destination change instruction that the storage destination OSU 15 of the ONU 17 is switched, instructs the switching source OSU 15 to stop transmission of a transmission permission message, and, notifies the information of the ONU 17 to be stored in the switching destination OSU 15, whereby the concentration switch 40 performs buffering of the down signal to the ONU 17 stored in the switching source OSU 15, and, the switching destination OSU 15 having received the information of the ONU 17 performs setting of the ONU 17 to be stored therein.

In the data transmission start procedure, when the switching destination OSU 15 completes the setting of the ONU 17 to be stored therein, the controller 20 notifies the concentration switch 40 and the switching destination OSU 15 of a switching completion notification that switching from the switching source OSU 15 to the switching destination OSU 15 is completed. The switching completion notification to the switching destination OSU 15 may be a light emission ON instruction instructing to start of light emission of a light source provided in the switching destination OSU 15. The concentration switch 40 having received the switching completion notification outputs a buffered down signal to the switching destination OSU 15. The switching destination OSU 15 having received the switching completion notification notifies the ONU 17 to be stored therein of restart of transmission. The transmission restart notification may be a Gate message for restarting DBA.

A message of notification of completion of transfer/reflection of the ONU information between the controller 20 and the switching destination OSU 15 may be transmitted at a timing other than the timings in FIGS. 2 and 3, and the message may be transmitted at any timing as long as the reflection of the ONU information is finished from the transmission of the DBA stop instruction to the transmission of the switching completion notification transmission instruction/light emission ON instruction. For example, a timing at which the transfer and reflection of the ONU information are completed during an optical switch switching time is considered.

Embodiment 2 of First Disclosure

Figure 4:
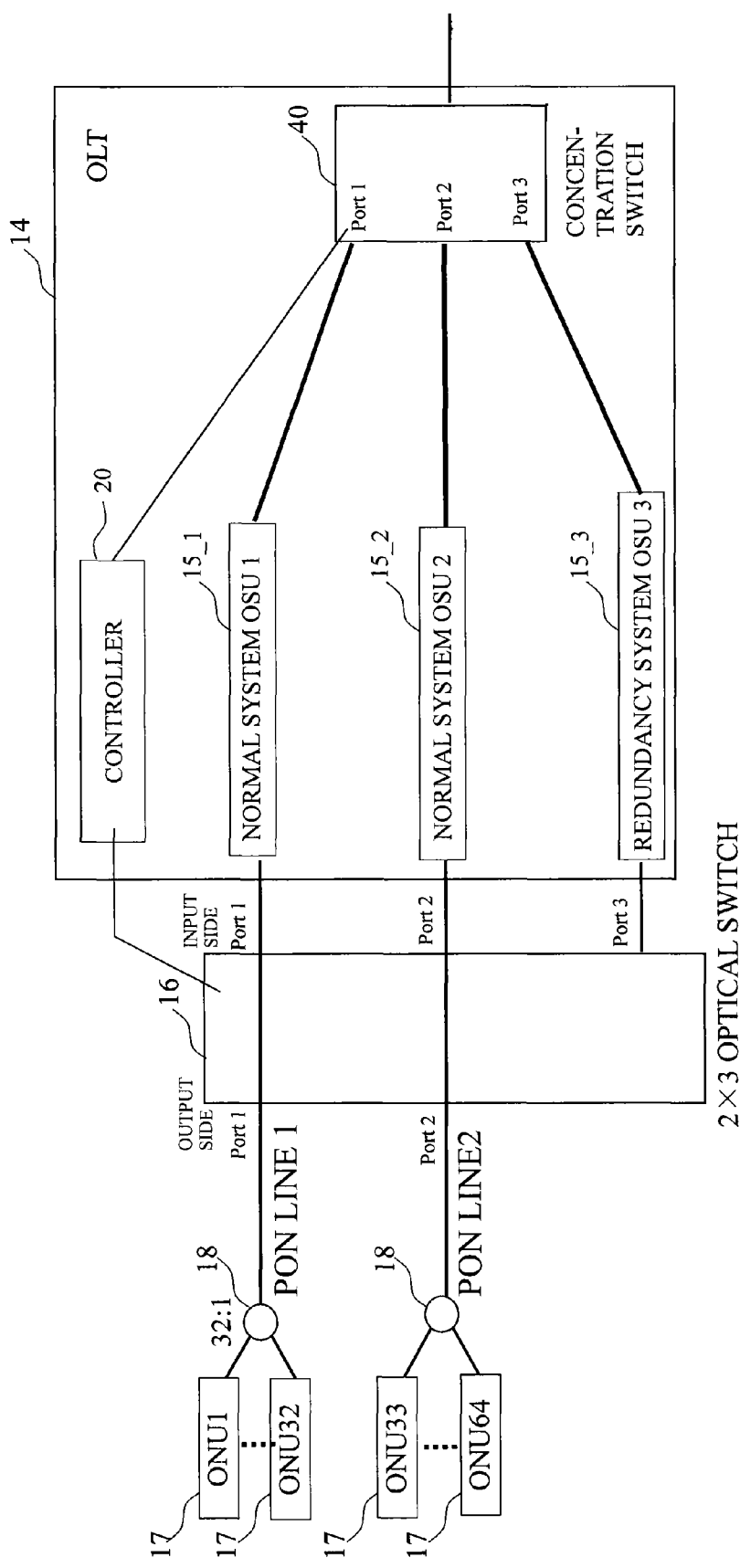
FIG. 4 shows an example of N:1 protection when N=2.
Figure 24:
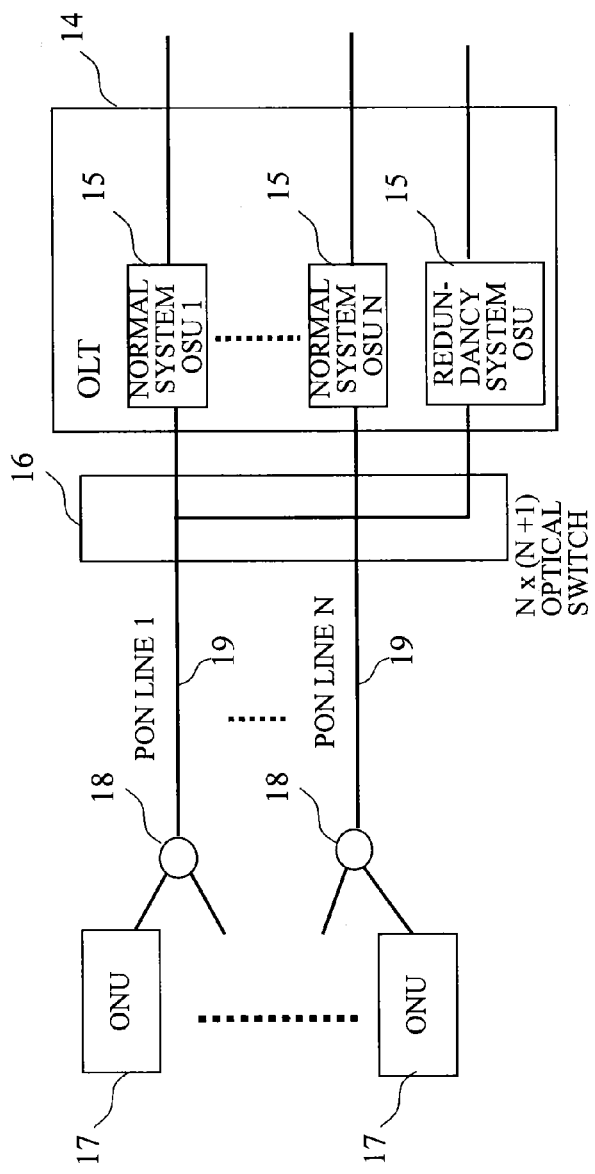
FIG. 24 shows an example of N:1 protection.

FIG. 4 shows an example in which the switching sequence and the OLT configuration in Embodiment 1 are applied to a PON system using the optical switch 16. In this embodiment, a system in a case where N=2 based on an N:1 protection in FIG. 24 is shown, and among three OSUs 15 in the OLT 14, two OSU 15_1 and OSU 15_2 are normal system OSUs, and one OSU 15_3 is a redundancy system OSU. When A=32, in a normal time, each of the normal systems OSUs 15_1 and 15_2 store 32 ONUs 17 through 2×3 optical switches 16 and PON lines 1 and 2, and the redundancy system OSU 15_3 is in a state of being not connected to any PON line through the 2×3 optical switch 16. In a normal time, each of the two normal system OSUs 15_1 and 15_2 notifies the controller 20 of the ONU information about the ONUs 17 subordinate to the normal system OSUs 15_1 and 15_2, so that the controller 20 holds the management table 21 shown in FIG. 5.

Figure 6:
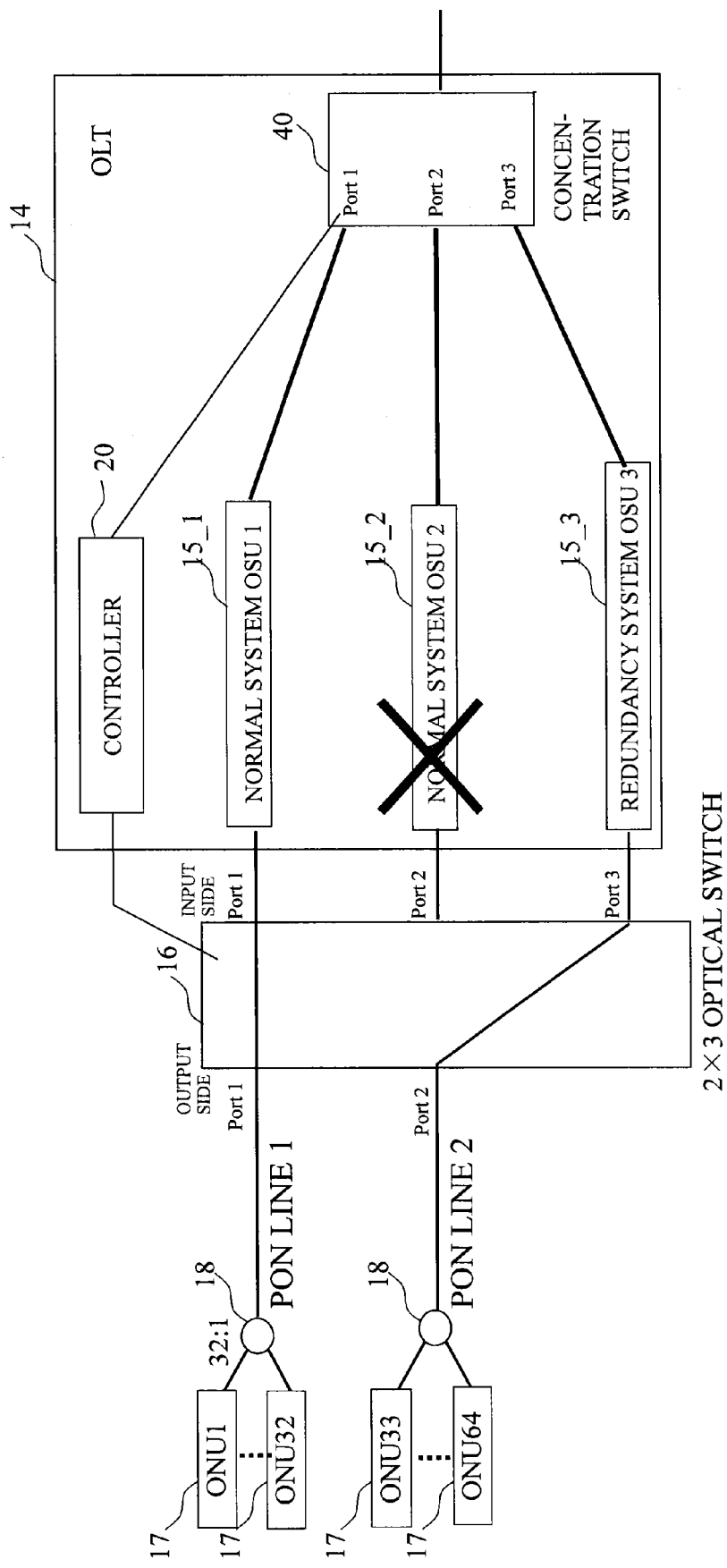
FIG. 6 shows an explanatory view of a switching operation when an OSU is failed, according to Embodiment 2 of the first disclosure.

In such a system, for example when FW of the OSU 15_2 is updated, first, in order to switch the connection destination OSU of the ONUs 17 (ONUs 33 to 64) from the OSU 15_2 to the redundancy system OSU 15_3, a command indicating the fact is input to the controller 20 by operation control. After that, processing is proceeded following the switching sequence in FIG. 3 with reference to the management table 21, the system of FIG. 4 is switched to a system shown in FIG. 6, and, the contents of the management table of FIG. 5 is updated to the contents shown in FIG. 7.

In the system of this embodiment, since output light of the switching source OSU 15_2 and output light of the switching destination OSU 15_3 do not collide, there is no problem even if an initial state of the switching destination OSU 15_3 is a light emission ON state. Accordingly, in this embodiment, in the switching sequence in FIG. 3, the controller 20 may not transmit the light emission ON instruction to the switching destination OSU 15_3.

As described above, while communication of the ONU 17 (ONUs 33 to 64) subordinate to the OSU 2 is maintained by switching to the redundancy system OSU 15_3 without instantaneous interruption, if the FW of the OSU 15_2 is updated, the FW can be updated without communication interruption in the ONU. After the update of the FW of the OSU 15_2, the redundancy system OSU 15_3 is switched (back) to the OSU 15_2 by similar operation control, whereby the ONUs 33 to 64 start communication with the OSU 15_2, in which the FW has been updated, without instantaneous interruption.

Embodiment 3 of First Disclosure

Figure 8:
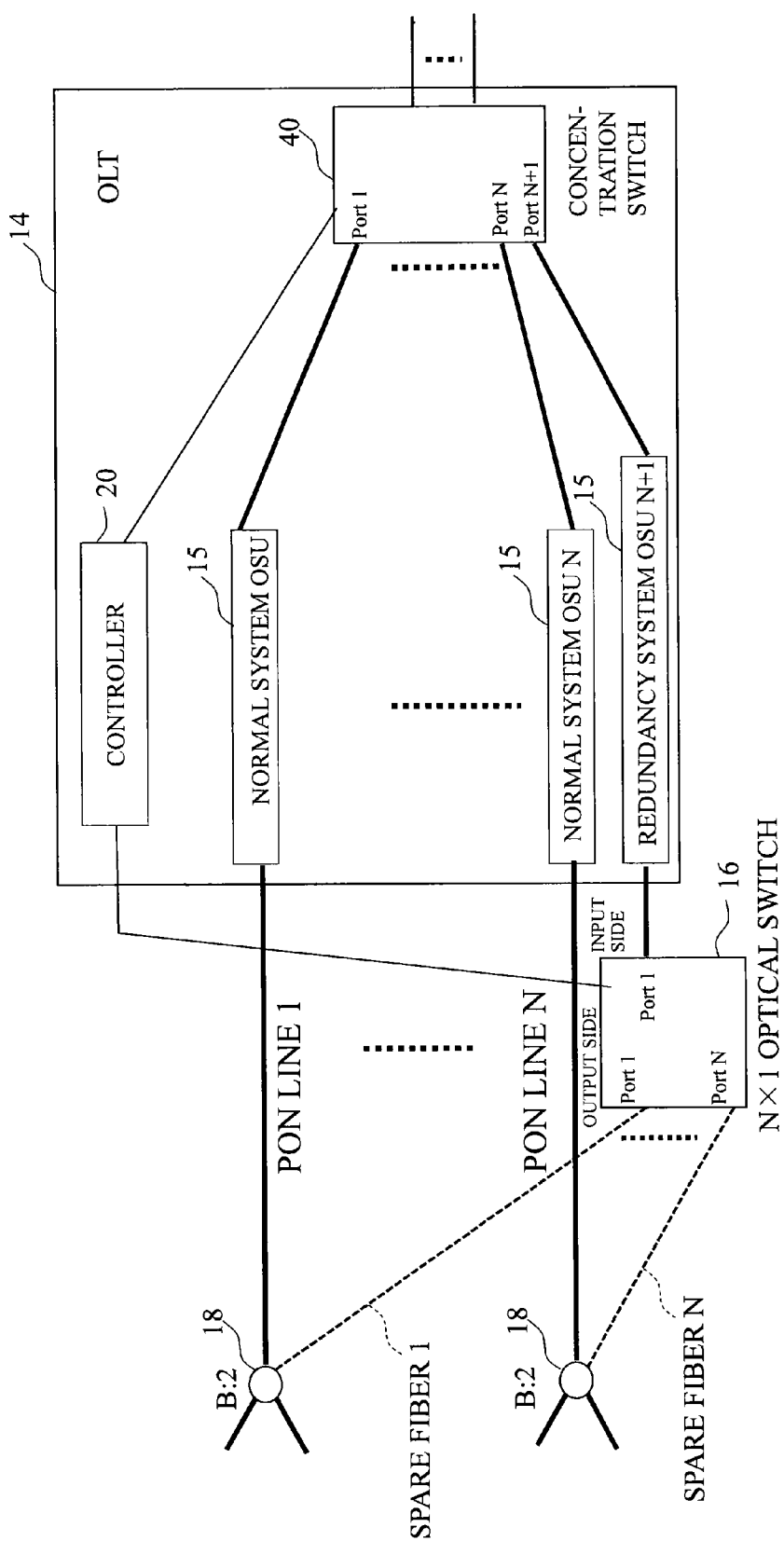
FIG. 8 shows an example of the N:1 protection in which optical switch exchange is easy, according to Embodiment 3 of the first disclosure.

FIG. 8 shows a case where the OLT 14 and the switching sequence are applied to an N:1 protection having a different configuration from Embodiment 2. In this embodiment, an OLT 14, an N×1 optical switch 16, N B:2 optical splitters 18 (1≤B≤A; however, when cost is not considered, it may be B>A technically), and A×N or less ONUs 17 are used. Among N+1 OSUs 15 in the OLT 14, N OSUs 15 (OSU 1 to OSU N) are normal system OSUs, and the remaining one is a redundancy system OSU (OSU N+1). Each of the N normal system OSUs 15 is connected to one port on a 2 side of the N B:2 optical splitters 18 through a PON line, and the redundancy system OSU 15 is connected to a 1 side (input side) of the N×1 optical switch 16 through an optical fiber. One port on the 2 side of the N B:2 optical splitters 18 is connected to the N side of the N×1 optical switch 16 through an optical fiber (referred to as a spare fiber), a B side of the B:2 optical splitter 18 is connected to up to B ONUs 17 through up to B optical fibers.

At the time of initial construction, the path of any port on the N side of the N×1 optical switch 16 is not connected to the ports on the 1 side so as to prevent output light from the redundancy system OSU 15 from colliding with output light from the normal system OSU 15 at a lower order section than the B:2 optical splitter 18 through the N×1 optical switch 16 and the spare fiber. In such a system, in a normal time, the normal systems OSU 15 communicate with the subordinated ONUs 17 not through the optical switch 16.

Figure 9:
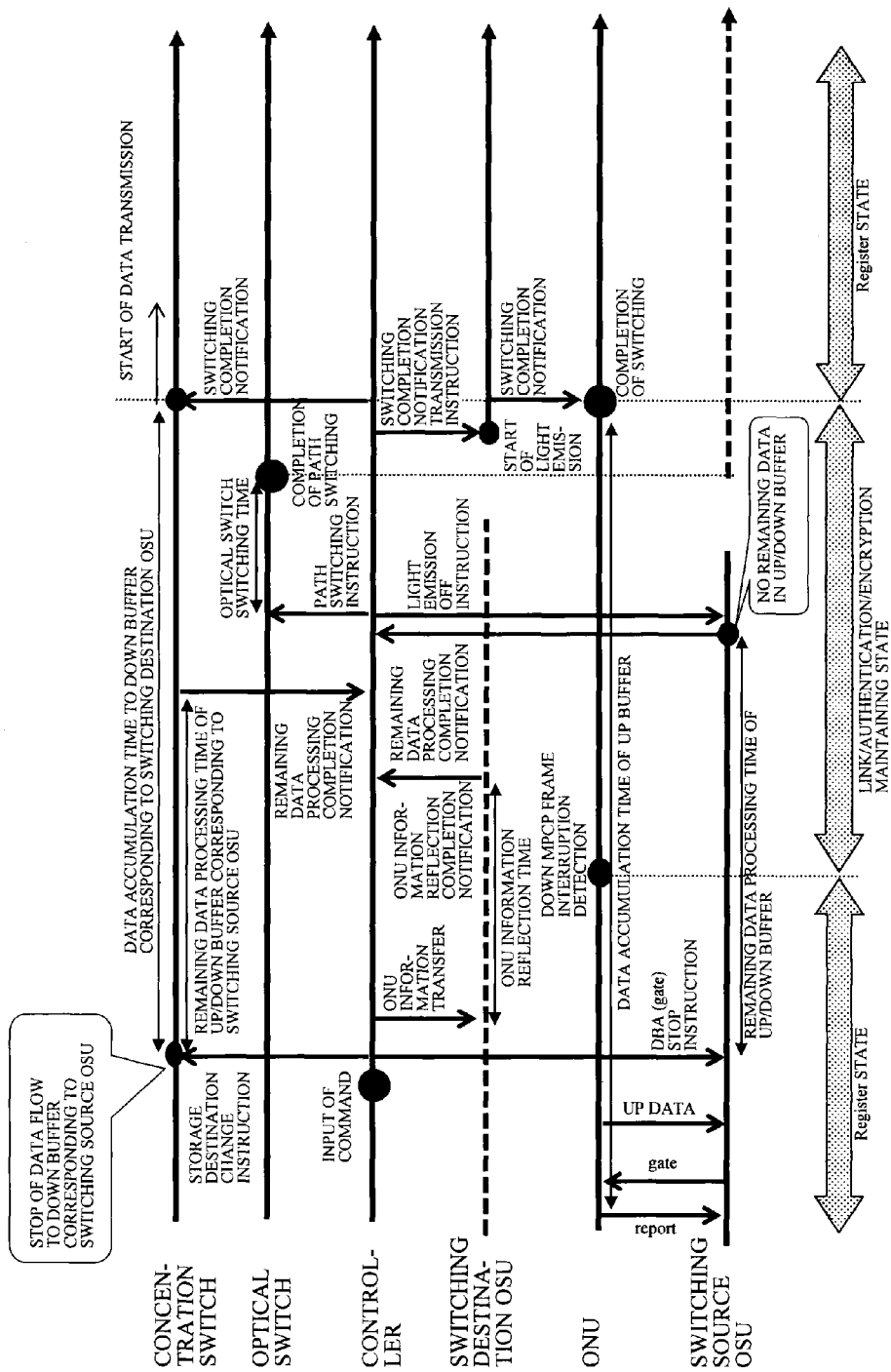
FIG. 9 shows an example of a switching sequence triggered by operation according to Embodiment 3 of the first disclosure.

In the system of this embodiment, when FW of an arbitrary normal system OSU 15 is updated, the OSU switching may be first performed by a method similar to that in Embodiment 2. However, after the normal system OSU 15 which is the switching source OSU 15 is switched to the redundancy system OSU 15 which is the switching destination OSU 15, in the system of this embodiment the switching source OSU 15 continues to maintain a physical path between the switching source OSU 15 and the ONU 17; therefore, the output light from the switching source OSU 15 and the output light from the switching destination OSU 15 collide with each other, so that communication failure may occur. In order to prevent such a situation, there is considered a method in which before the switching destination OSU 15 starts data communication with the ONU 17, the controller 20 transmits the light emission OFF instruction to the switching source OSU 15, and the switching source OSU 15 having received the instruction stops light emission. Accordingly, in the switching sequence in this embodiment, as shown in FIG. 9, the controller 20 receives the remaining data processing completion notification from the switching source OSU 15 and thereafter transmits the light emission OFF instruction to the switching source OSU 15 before transmission of the switching completion notification transmission instruction, and it is preferable that this operation is added to the sequence of Embodiment 1.

As described above, the OSU switching is performed without instantaneous interruption, and while the ONU 17 subordinate to the switching source OSU 15 (normal system OSU) performs data communication with the switching destination OSU 15 (redundancy system OSU), FW of the normal system OSU 15 is updated. After the update of the FW of the normal system OSU 15, the redundancy system OSU 15 is switched (back) to the normal system OSU 15 by the operation control similar to that in Embodiment 1, whereby the ONU 17 subordinate to the normal system OSU 15 can start communication with the normal system OSU 15, in which the FW has been updated, without instantaneous interruption.

Embodiment 4 of First Disclosure

In the OLT 14 of the present disclosure, although switching without instantaneous interruption is difficult, the OLT 14 corresponds to the normal ONU 17, and at least the effect can be expected in comparison with the prior art FW update method. The switching without instantaneous interruption according to the above operation assumes the application of the following ONU 17.

In this example, the ONU 17 described in the flows of FIGS. 2 and 9 will be described. Namely, when the ONU 17 detects down MPCP frame interruption, the ONU 17 maintains link/authentication/encryption (information relating to control/management/registration) and continues to accumulate the received up frames in the buffer in the ONU 17 until restart of transmission. When the switching of the OSU 15 is completed, the down signal or the switching completion notification is transmitted from the switching destination OSU 15 to the ONU 17, so that the ONU 17 grasps completion of the OSU switching. Thus, the ONU 17 restarts transmission of the up frame to the OSU 15, using the previous link/authentication/encryption (information relating to control/management/registration). According to this constitution, the time until retransmission can be shortened, and, it is possible to obtain an effect of reducing a loss of frame.

In each embodiment, there has been described a configuration in which the concentration switch 40 and the OSU 15 are built in the OLT 14. Even in a case where the concentration switch 40 is externally attached to the OLT 14 separately from the OSU 15, the technique of the present disclosure can be realized. In this case, transmission and reception of signals between the controller 20 in the OLT 14 and the concentration switch 40 outside the OLT 14 and transmission and reception of signals between the OSU 15 in the OLT 14 and the concentration switch 40 outside the OLT 14 are as described above.

Embodiment 5 of First Disclosure

Figure 10:
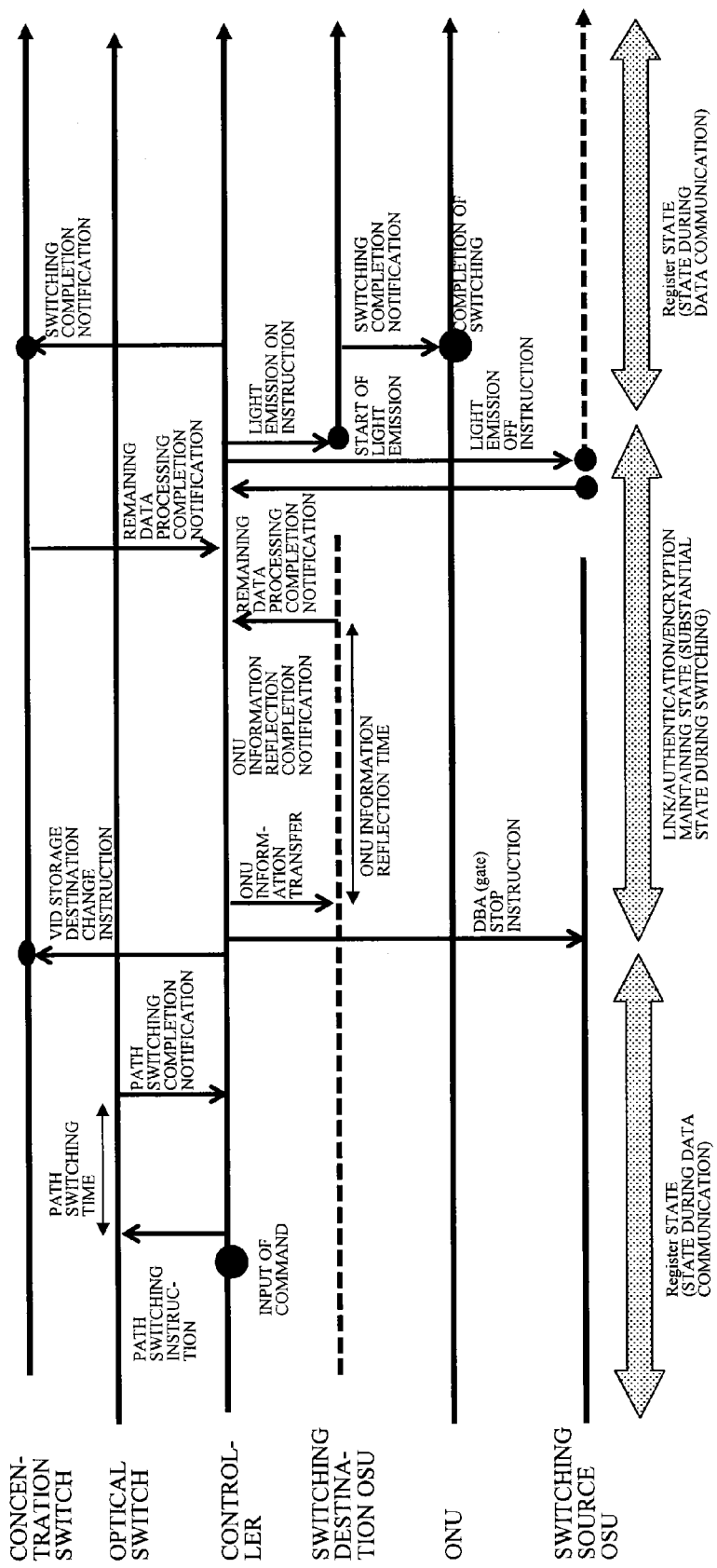
FIG. 10 shows an example of a switching sequence triggered by operation according to Embodiment 5 of the first disclosure.

FIG. 10 shows a switching sequence triggered by operation according to this embodiment. In this embodiment, in an optical network system in which the switching source OSU 15 is switched to the switching destination OSU 15 by using the N×1 optical switch 16 shown in FIG. 8, any of the normal system OSUs 15 is switched to the redundancy system OSU 15. In this embodiment, the switching destination OSU 15 is in the light emission OFF state before the OSU switching procedure.

In the OSU switching procedure, the controller 20 first notifies the optical switch 16 of the information of the ONU 17 to be stored in the switching destination OSU 15. According to this constitution, the optical switch 16 connects the notified ONU 17 to the switching destination OSU 15. Upon completion of the connection, the optical switch 16 transmits the path switching completion notification to the controller 20.

The controller 20 having received the path switching completion notification transmits, to the concentration switch 40, such storage destination change instruction that the storage destination OSU 15 of the ONU 17 is switched, instructs the switching source OSU 15 to stop transmission of the transmission permission message, and, notifies the switching destination OSU 15 of the information of the ONU 17 to be stored therein.

The concentration switch 40 receives the storage destination change instruction to switch the down buffer addressed to the switching source OSU 15 to the down buffer addressed to the switching destination OSU 15 and, performs buffering of the down signal to the ONU 17 having been stored in the switching source OSU 15. At this time, when the up or down buffer corresponding to the switching source OSU 15 includes data having been accumulated, the data is output to the switching source OSU 15, and when the processing of outputting the data is completed, the concentration switch 40 notifies the controller 20 of the completion of the remaining data processing.

The switching source OSU 15 receives the instruction for stopping transmission of the transmission permission message and stops transmission of the transmission permission message for permitting transmission of the up signal to the ONU 17 stored in the switching source OSU 15. According to this constitution, each ONU 17 stored in the switching source OSU 15 stops transmission of the up signal to the ONU 15 in which the ONU 17 is to be stored, and when there is the up signal, the up signal is accumulated in the buffer. At that time, where there is the up or down signal accumulated in the up or down buffer possessed by itself, these signals are transmitted, and after the processing of outputting the up or down signal is completed, the remaining data processing completion is notified to the controller 20.

The switching destination OSU 15 receives the information of the ONU 17 to be stored therein and performs setting of the ONU 17 to be stored therein. When the setting is completed, the switching destination OSU 15 notifies the controller 20 of the completion of reflection of the ONU information.

When the controller 20 receives the remaining data processing completion notifications from the concentration switch and the switching source OSU and receives the ONU information reflection completion notification from the switching destination OSU 15, the controller 20 notifies the concentration switch 40 and the switching destination OSU 15 of completion of the switching. According to this constitution, the data transmission start procedure is started.

In the data transmission start procedure, the controller 20 notifies the concentration switch 40 and the switching destination OSU 15 of completion of the switching. Then, the concentration switch 40 outputs the buffered down signal to the switching destination OSU 15 and, notifies the ONU 17 to be stored in the switching destination OSU 15 of restart of transmission. The switching completion notification from the controller 20 to the switching destination OSU 15 may be the light emission ON instruction instructing to start of light emission of a light source provided in the switching destination OSU 15. The transmission restart notification may be a Gate message for restarting DBA.

In this embodiment, since the N×1 optical switch 16 is used, if the path switching according to the optical switch 16 is performed in such a state that data is being communicated, a main signal is not affected. Thus, the path switching is performed by the optical switch 16 before the concentration switch 40 and the switching source OSU 15 start buffering, whereby a substantial switching time (data conduction stop time) can be shortened, and the buffers of the concentration switch 40 and the ONU 17 can be reduced.

Embodiment 6 of First Disclosure

Figure 11:
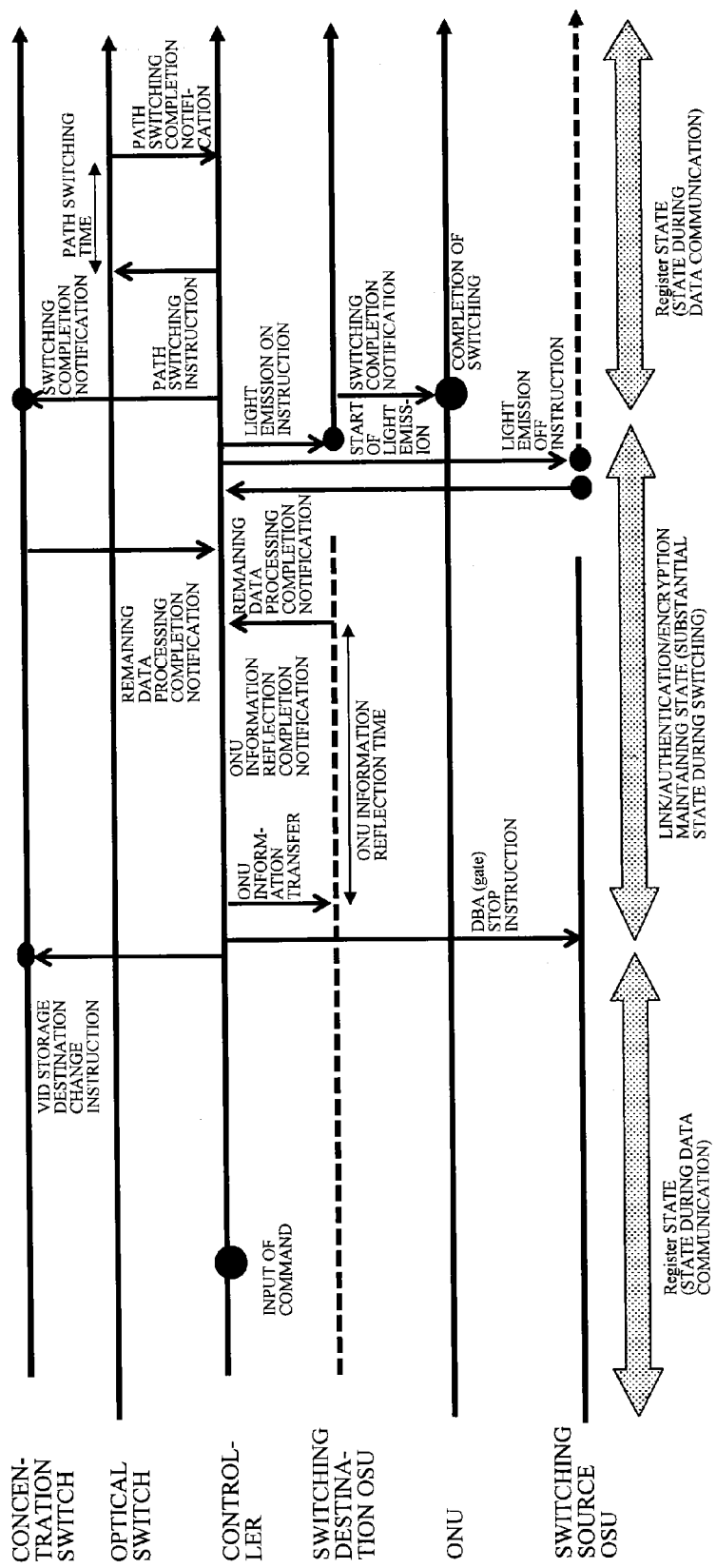
FIG. 11 shows an example of a switching sequence triggered by operation according to Embodiment 6 of the first disclosure.

FIG. 11 shows a switching sequence triggered by operation according to this embodiment. In this embodiment, in Embodiment 5 of the first disclosure, the normal system OSU 15 is not switched to the redundancy system OSU 15, but switching back is performed so that the redundancy system OSU 15 is switched to any of the normal system OSU 15.

In this embodiment, since the N×1 optical switch 16 is used, even when the redundancy system OSU 15 is used, each of the normal system OSUs 15 is connected to the ONU 17 to be stored therein. Thus, in this embodiment, switching is substantially completed when the light emission of the redundancy system OSU 15 is made off and the light emission of the normal system OSU 15 is made on, and the path of the optical switch 16 is not switched in the OSU switching procedure. After such switching-back, the path of the optical switch 16 may not be switched as long as the light emission OFF state of the redundancy system OSU is continued until the next switching. If it is preferable that a path connection state of the optical switch is returned to an initial state, in a state during data communication after execution of the data transmission start procedure, the path of the optical switch 16 is switched so that the redundancy system OSU 15 does not establish a path with any ONU 17.

In this embodiment, since switching of the path of the optical switch 16 in the OSU switching procedure can be omitted, a substantial switching time (data conduction stop time) can be shortened, so that the buffers of the concentration switch 40 and the ONU 17 can be reduced.

Embodiment 1 of Second Disclosure

Figure 12:
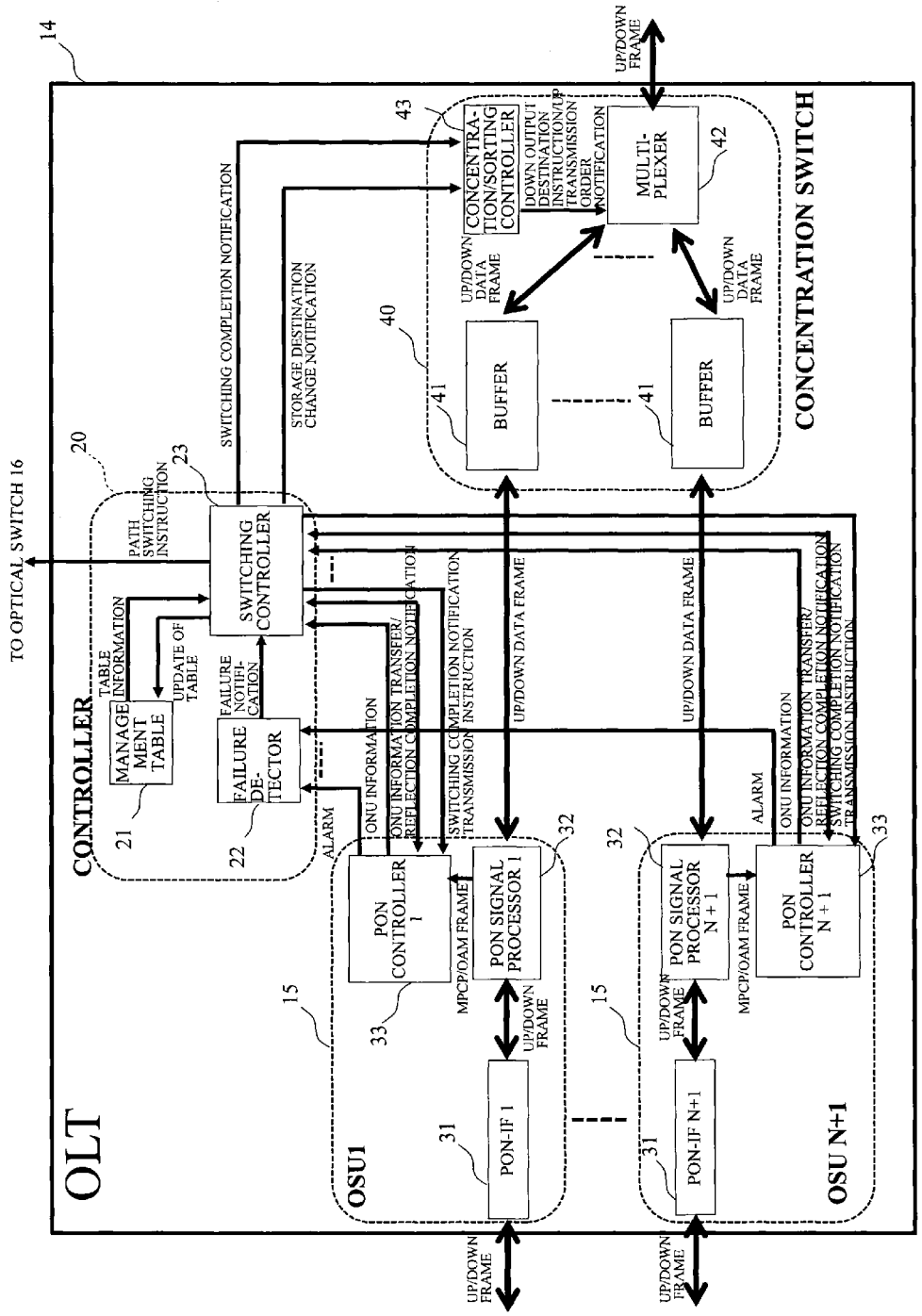
FIG. 12 shows a schematic configuration of OLT provided in an optical network according to Embodiment 1 of a second disclosure.

FIG. 12 shows a schematic configuration of an OLT provided in an optical network according to Embodiment 1. An OLT 14 according to Embodiment 1 is provided with (N+1) OSUs 15, a controller 20 for switching control, and a concentration switch 40. Each OSU 15 is provided with a PON-IF 31, a PON signal processor 32, and a PON controller 33, the controller 20 is provided with a switching controller 23, a failure detector 22, and a management table 21, and the concentration switch 40 is provided with a concentration/sorting controller 43, a multiplexer 42, and (N+1) buffers 41. The buffer 41 is provided with an up buffer and a down buffer. Other configurations unnecessary for the description will be omitted.

The OLT 14 in this constitution is assumed to be applied in a PON protection system using an optical switch 16, and as the object, when an OSU is failed in such a system, the OSU 15 is switched at high speed without link interruption in the ONU 17. The optical switch 16 is provided with input/output ports on the OSU 15 side and input/output ports on the ONU 17 side, and the input/output ports on the OSU 15 side are connected to the OSU 15 through optical fibers, and the input/output ports on the ONU 17 side are connected to the ONU 17 through optical fibers 19 (moreover, optical splitters 18).

As long as the PON protection system is a system in which the OSU 15 is made redundant, the OLT 14 in this constitution is applicable to the PON protection system even when the optical switch 16 is not used. In the system in both the cases, in the OLT 14 in this constitution, when the OSU failure occurs, the OSU 15 can be switched at high speed without link interruption in the ONU 17.

Hereinafter, the OLT 14 is applied in a case of using the optical switch 16, and the operation of each function block will be described.

PON-IF 31 receives an up frame of an optical signal from the ONU 17 connected to the corresponding PON-IF 31 or a down frame of an electrical signal from a PON signal processor 32 to convert the frame into an electric signal or an optical signal, and, thus, to output the signal to the PON signal processor 32 or outside the PON-IF 31 (ONU 17 side).

The PON signal processor 32 receives the up frame of the electrical signal from the PON-IF 31, when the up frame is data frame, the PON signal processor 32 outputs the data frame to the buffer 41 of the concentration switch 40, and when the up frame is a frame other than the data frame (MPCP frame or OAM frame), the PON signal processor 32 outputs the frame to the PON controller 33 and, receives the down data frame of the electrical signal from the buffer 41 of the concentration switch 40 to output the down data frame to the PON-IF 31.

The PON controller 33 receives an MPCP frame and an OAM frame from the PON signal processor 32 and performs control necessary for data communication with the ONU 17, such as registration management and uplink band allocation of the ONU 17 subordinate to the corresponding OSU 15 in accordance with the contents and, outputs information (referred to as ONU information) relating to the corresponding ONU 17, managed and grasped by the PON controller 33 based on the control, to the switch controller 23 of the controller 20 periodically or for each update of the information. The PON controller 33 detects the presence and absence of a failure in the corresponding OSU 15, and when the failure occurs, the PON controller 33 outputs an alarm signal to a failure detector 22 of the controller 20. When the switching controller 23 transfers the ONU information to the PON controller 33, the PON controller 33 having received the ONU information updates the contents of the ONU information managed and grasped by that time to follow the contents of the received ONU information, and when the update is completed, the PON controller 33 outputs a reflection completion notification to the switching controller 23. Further, when the instruction of transmission of the switching completion notification is transmitted from the switching controller 23 to the PON controller 33, the PON controller 33 receives the instruction and, outputs the switching completion notification to the ONU 17 (through the PON-IF 31).

When the failure detector 22 receives the alarm signal from the PON controller 33 of the OSU 15, the failure detector 22 outputs such a failure notification that a failure occurs in the corresponding OSU 15 to the switching controller 23.

The switching controller 23 receives the ONU information from the PON controller 33 and outputs a table update instruction to the management table 21 so that the table is updated to follow the contents of the information. In the switching controller 23, when the ONU information instruction from a specified OSU 15 is interrupted, or when the switching controller 23 receives a failure notification about the specified OSU 15 from the failure detector 22, the switching controller 23 recognizes and detects the failure of the corresponding OSU 15, outputs the storage destination change instruction to the concentration/sorting controller 43 of the concentration switch 40, obtains the ONU information relating to the ONU 17 subordinate to the failed OSU 15 from the management table 21, and transfers the ONU information to the switching destination OSU 15. The switching controller 23 outputs the path switching instruction to the optical switch 16 after receiving the reflection completion notification from the PON controller 33 of the switching destination OSU 15 or at any timing. The switching controller 23 can output a switching completion notification to the concentration/sorting controller 43 of the concentration switch 40 in a timing at which the reflection completion notification is received from the switching destination OSU 15 and in a timing at which the path switching performed by the optical switch 16 is finished.

Regarding all the ONUs 17 subordinate to the OLT 14, the ONU information of each ONU 17 is described in detail in the management table 21, and a connection destination OSU number for each ONU 17, a connection destination concentration switch port number, a connection destination optical switch input/output side port number, a VID number and so on are described in the management table 21. Accordingly, the controller 20 can grasp in detail physical connection situations and registration/management information of all the ONUs 17 and all the OSUs 15 through the management table 21. When the management table 21 receives the table update instruction from the switching controller 23, the management table 21 is updated following the contents.

The concentration/sorting controller 43 has association of a VID number and an ONU number and information of connection destination OSU number/concentration switch port number of each ONU 17 previously registered through the controller 20 and instructs the multiplexer 42 the corresponding output destination buffer 41 of the down frame received by the multiplexer 42 in accordance with these information. When the concentration/sorting controller 43 receives the storage destination change instruction from the switching controller 23, the concentration/sorting controller 43 changes the connection destination OSU number information of the corresponding ONU 17 registered in itself, following the contents and, stops the output of the down frame from the buffer 41 corresponding to the switching destination OSU 15. Further, the concentration/sorting controller 43 determines a transmission order of the up frames accumulated in the respective buffers 41 according to an arbitrary scheduling method previously set in itself and notifies the multiplexer 42 of the determined transmission order. When the concentration/sorting controller 43 receives the switching completion notification from the switching controller 23, the concentration/sorting controller 43 allows the corresponding buffer 41 having stopped the output of the down frame to output the down frame.

The multiplexer 42 receives the down data frame from a section at a higher order than the OLT 14 and outputs the down data frame to the corresponding buffer 41 in accordance with the VID number of the received frame and the instruction from the concentration/sorting controller 43, separates the down data frame for each predetermined data in accordance with a transmission order notified from the concentration/sorting controller 43 to instruct the output of the up frame to the corresponding buffer 41 in accordance with the transmission order notified from the concentration/sorting controller 43, receives the up frames from the buffers 41, and outputs the up frames to the high-order section in sequence.

The buffer 41 receives and accumulates the up data frame from the PON signal processor 32 and, outputs the up data frames in sequence to the multiplexer 42 in accordance with the instruction from the multiplexer 42. Meanwhile, when the buffer 41 receives and accumulates the down data frames from the multiplexer 42, the buffer 41 outputs the down data frames in sequence to the PON signal processor 32 in accordance with the instruction from the multiplexer 42. The buffer 41 can stop and start the output of the frames in accordance with an output stop/output permission instruction from the concentration/sorting controller 43.

The OLT 14 constituted of the function blocks operating as above is applied to the PON system using the optical switch 16, whereby the OSU 15 is made redundant in preparation for the failure of the OSU 15, and, high-speed switching is realized when the OSU 15 is failed, so that the PON protection suppressing a frame loss during switching can be realized.

An OSU switching method of an optical network system and an OSU switching method in a station-side termination apparatus according to the present embodiment have a monitoring procedure, an OSU switching procedure, and a data transmission start procedure in this order. In a normal time, the monitoring procedure is performed. When the switching source OSU 15 is failed, the data transmission start procedure is performed after the OSU switching procedure in which the OSU is switched.

Figure 13:
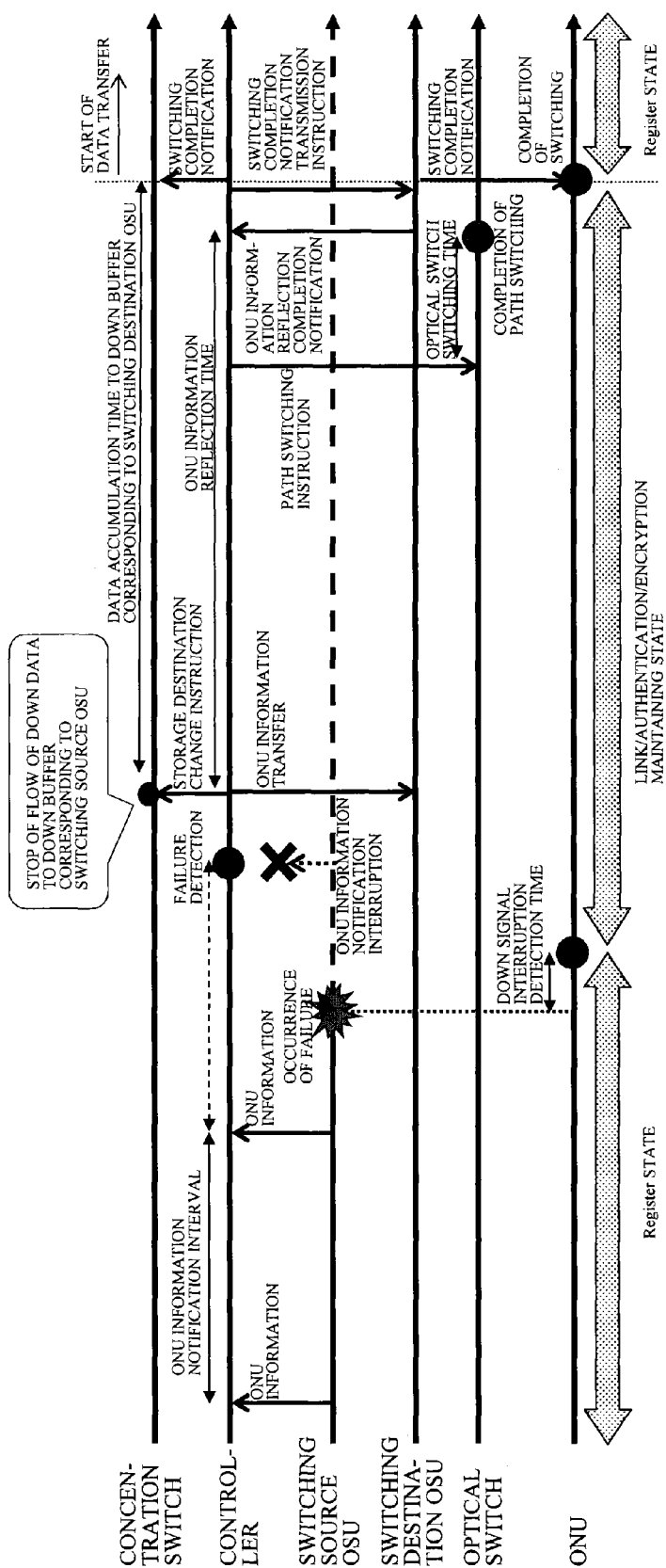
FIG. 13 shows an example of a switching sequence when an OSU is failed, according to Embodiment 1 of the second disclosure when an ONU information reflection time is longer than an optical switch switching time.

FIG. 13 shows a switching sequence when the OSU 15 is failed in the PON system using the OLT 14 and the optical switch 16. In this drawing, based on a temporal axis of each element of the concentration switch 40, the controller 20, the switching source OSU 15, the switching destination OSU 15, the optical switch 16, and the ONU 17, points on the temporal axis show occurrence and termination of events (such as occurrence of a failure and completion of switching), and arrows connecting elements show exchange of messages and information. Thin arrows in both directions represent states and operation time, and thick arrows in both directions represent the state of the ONU 17.

In this example, a power interruption failure (it is assumed that operation is immediately stopped) is considered as the failure of the OSU 15, and as a detection trigger for the failure of the OSU 15, a case where the controller 20 detects ONU information communication interruption from the OSU 15 (switching source OSU) to the controller 20 is considered.

In a normal time, the switching source OSU 15 notifies the controller 20 of the ONU information about the subordinated ONU 17 at fixed time intervals. However, the switching source OSU 15 cannot notify the controller 20 of the ONU information due to occurrence of the failure of the switching source OSU 15, and the controller 20 detects the failure of the switching source OSU 15 when there is no notification of the ONU information from the switching source OSU 15.

When the switching source OSU 15 is failed, the ONU 17 subordinate to the switching source OSU 15 detects down signal reception interruption/down light reception power reduction; however, even if the ONU 17 used in this system detects such a situation in a register state, for example, the link interruption does not immediately occur in the ONU 17, and the ONU 17 has a function of transiting a state from the register state to a state in which link, authentication, and encryption are maintained. The state transition function is used for preventing the link interruption in the ONU 17 and eliminating reconnection operation of, for example, a link between the ONU 17 and the switching source OSU 15 after switching and namely is one of functions of realizing high speed switching. If keep-alive interruption between the OSU 15 and the controller 20 can be detected, the ONU information notification interruption may not be always triggered by failure detection.

The controller 20 having detected the failure of the switching source OSU 15 immediately notifies the concentration switch 40 of a change of the storage destination of a frame. The concentration switch 40 having received the storage destination change notification changes the buffer 41 in which the down frame addressed to the ONU 17 subordinate to the switching source OSU 15 is to be accumulated from the buffer (referred to as switching source down buffer 41) corresponded to the switching source OSU 15 to the buffer 41 (a switching destination down buffer 41) corresponded to the switching destination OSU 15 and starts accumulation of the down frames addressed to the corresponding ONU 17 in the switching destination buffer 41. According to this constitution, it is possible to stop accumulation of the down frame from a high-order section, addressed to the ONU 17 subordinate to the switching source OSU 15, in the switching source buffer 41. Even if the frames are accumulated in the switching source buffer 41, the down frames are not delivered to the corresponding ONU 17, and therefore, the storage destination of the frames are immediately changed, whereby the frame loss occurring during switching can be suppressed. The down frame addressed to the corresponding ONU 17 is continued to be accumulated in the switching destination down buffer 41 without being output until the controller 20 issues an instruction (switching completion notification).

The controller 20 transfers, to the switching destination OSU 15, the ONU information about the ONU 17 subordinate to the switching source OSU 15 which is described in the management table 21. The switching destination OSU 15 having received the ONU information performs a registration setting following the contents of the ONU information, and when the setting is completed, the switching destination OSU 15 transmits the reflection completion notification to the controller 20.

After the controller 20 receives the reflection completion notification, in order to switch the connection destination OSU 15 of the ONU 17 subordinate to the failed OSU 15 to the switching destination OSU 15, the controller 20 issues a path switching instruction to the optical switch 16 in accordance with the management table 21 so that a connection destination of the input and output of the optical switch 16 is switched to the corresponding path.

The optical switch 16 receives the instruction to perform path switching.

Next, the data transmission start procedure to be hereinafter described is performed.

The controller 20 transmits the path switching instruction and thereafter notifies the switching destination OSU 15 of the switching completion notification transmission instruction when the path switching in the optical switch 16 is finished. Here, upon completion of the path switching, when the optical switch 16 can notify the fact that the path switching is completed to the controller 20, there is considered a method of notifying the switching destination OSU 15 of a switching completion notification transmission instruction after the controller 20 receives the notification. Hereinafter, there will be considered only a method of performing notification when the path switching in the optical switch 16 is finished. The switching destination OSU 15 having received the instruction transmits such a switching completion notification that switching is completed to the ONU 17 newly incorporated to be subordinate to the OSU 15 by the path switching.

When the ONU 17 in the link/authentication/encryption maintaining state receives the switching completion notification, the ONU 17 immediately returns to the Register state and can perform data communication with the switching destination OSU 15.

The switching completion notification is transmitted from the controller 20 to the concentration switch 40 in a similar timing, and the concentration switch 40 having received the notification starts to transmit the down data addressed to the corresponding ONU 17 and accumulated in the switching destination buffer 41.

According to the above switching sequence, the occurrence of the loss of the down frame arrived at the OLT 14 during switching can be suppressed, and by virtue of the switching without link interruption in the ONU 17, data communication can be immediately restarted after the completion of switching.

Figure 14:
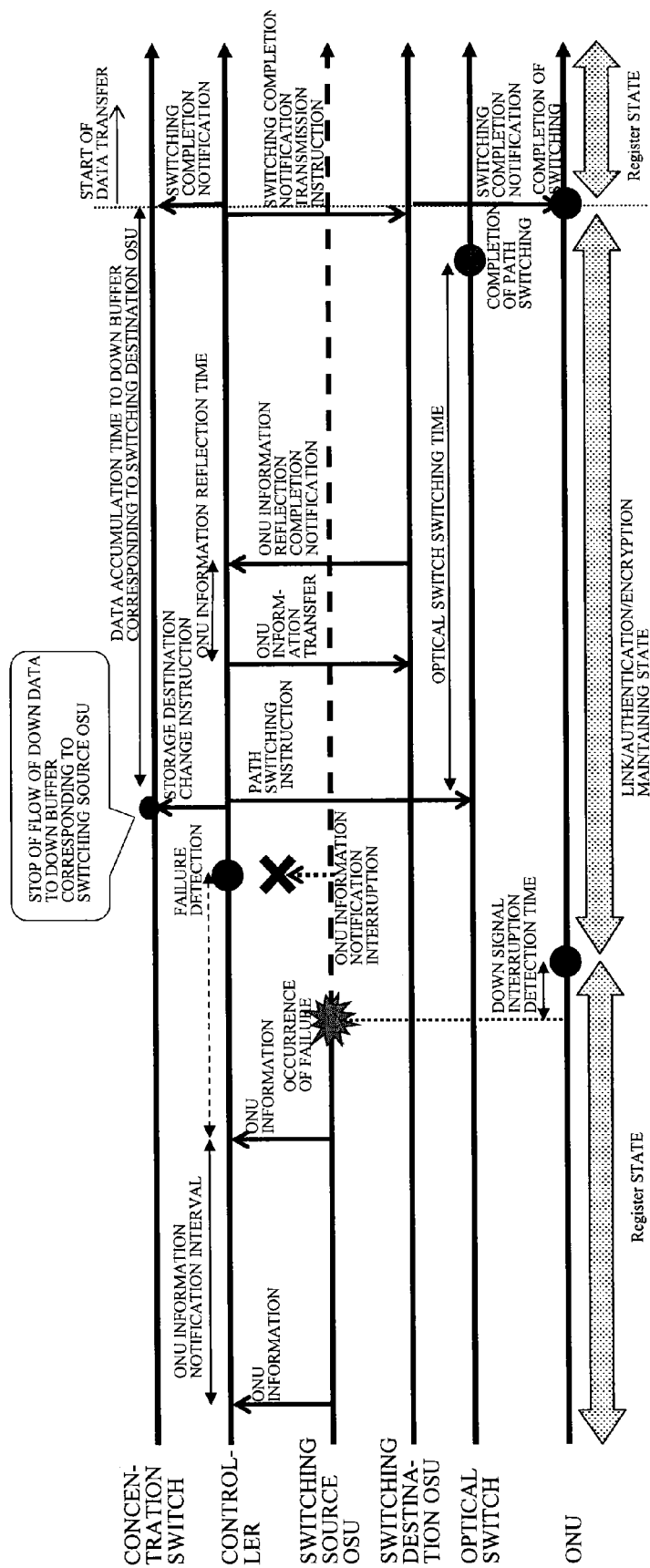
FIG. 14 shows an example of the switching sequence when the OSU is failed, according to Embodiment 1 of the second disclosure when the ONU information reflection time is shorter than the optical switch switching time.

The transmission order of the message from the transfer of the ONU information from the controller 20 to the switching destination OSU 15 to the instruction of the transmission of the switching completion notification is not limited to the transmission order in FIG. 13, and the transmission order in FIG. 14 can be considered. The sequence in FIG. 13 should be applied when an ONU information reflection time (a time from reception of the ONU information transfer from the controller 20 to transmission of the ONU information reflection completion notification to the controller 20) in the switching destination OSU 15 is satisfactorily longer than an optical switch switching time (a time from reception of the path switching instruction from the controller 20 to completion of path switching), and the path switching performed by the optical switch 16 is completed during reflection of the ONU information, whereby the total switching time can be shortened. Meanwhile, the sequence of FIG. 14 is a sequence that should be applied when the optical switch switching time is satisfactorily longer than the ONU information reflection time, and the ONU information reflection is completed during path switching, whereby the total switching time can be shortened similarly.

As described above, an optimum sequence is selected from the sequences of FIGS. 13 and 14 in consideration of the optical switch switching time depending on the performance of the optical switch 16 to be used and the ONU information reflection time depending on the number of the ONUs 17 connected per one OSU, and the reflection of the ONU information and path switching performed by the optical switch 16 are performed in parallel, whereby high speed switching can be realized.

Further, in this embodiment, although the OLT 14 mounted with the concentration switch 40 is considered, the concentration switch 40 is not always mounted inside the OLT 14 as long as the above operation and control can be realized among the OSU 15, the concentration switch 40, and the controller 20. For example, the L2SW 12 is disposed in a section at a higher order than the OLT 14 instead of mounting the concentration switch 40 in the OLT 14, whereby a network configuration applying the PON protection can be adopted. In this case, the controller 20 and the OSU 15 of the OLT 14 and the high-order L2SW 12 are relatively cooperated, and when the above operation, control, and switching sequence are performed, effects (high speed switching at the time of the failure of the OSU 15 and suppression of the frame loss at the time of switching) similar to this embodiment can be expected. Although the same can be said for the case to be described later, the description will be hereinafter omitted.

Embodiment 2 of Second Disclosure

Although the ONU information notification interruption is considered as the trigger of the detection of the failure of the OSU 15 in Embodiment 1, there is considered the case of such a failure pattern that the ONU information can be notified even if a portion of a function is failed, such as a failure of a receiver in the PON-IF 31, and in such a case, the ONU information notification interruption cannot trigger the failure detection. Thus, it is considered that the OSU 15 itself detects its own failure only in a specific failure pattern, and the OSU 15 transmits the alarm signal to the controller 20 when detecting the failure, whereby the controller 20 detects and recognizes the failure of the OSU 15.

Figure 15:
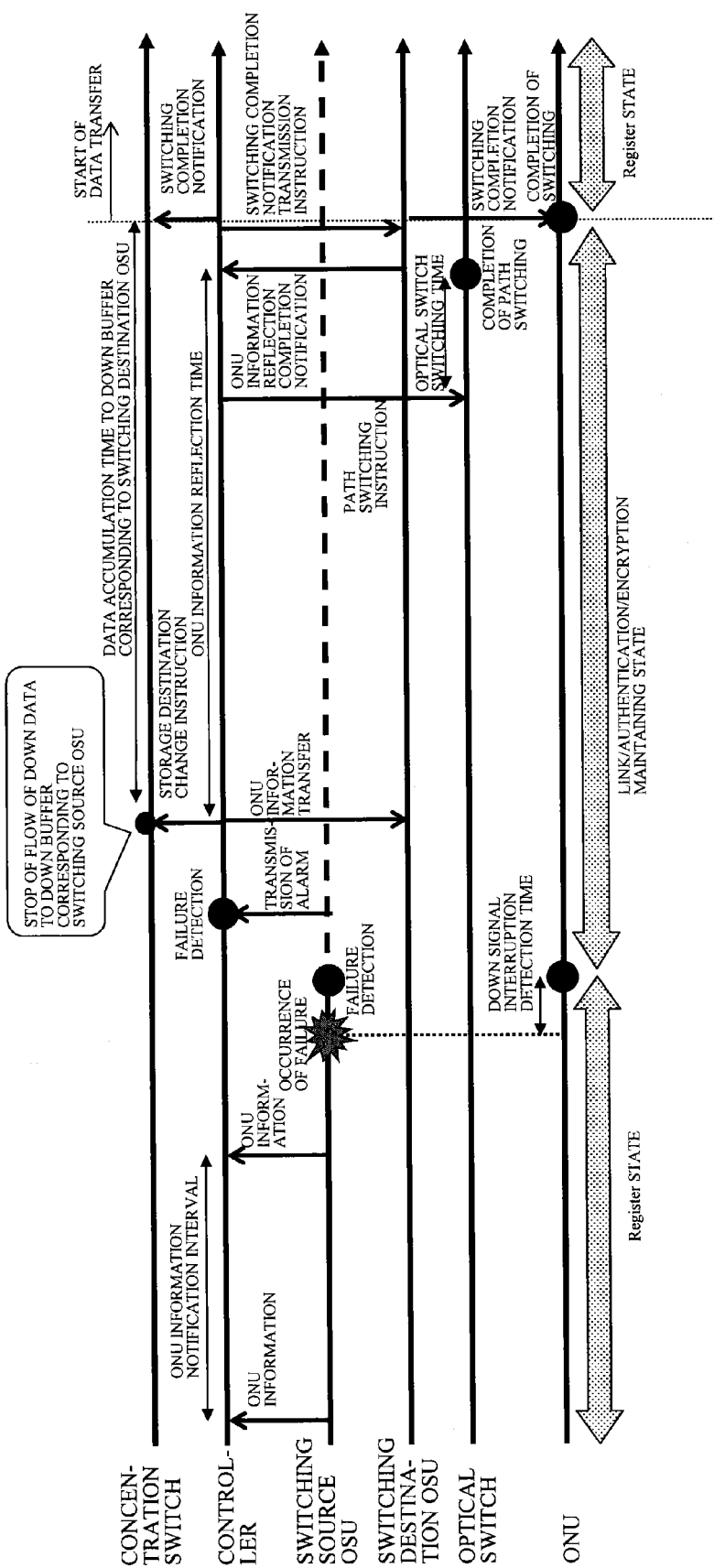
FIG. 15 shows an example of a switching sequence when an OSU is failed, according to Embodiment 2 of the second disclosure when an ONU information reflection time is longer than the optical switch switching time.
Figure 16:
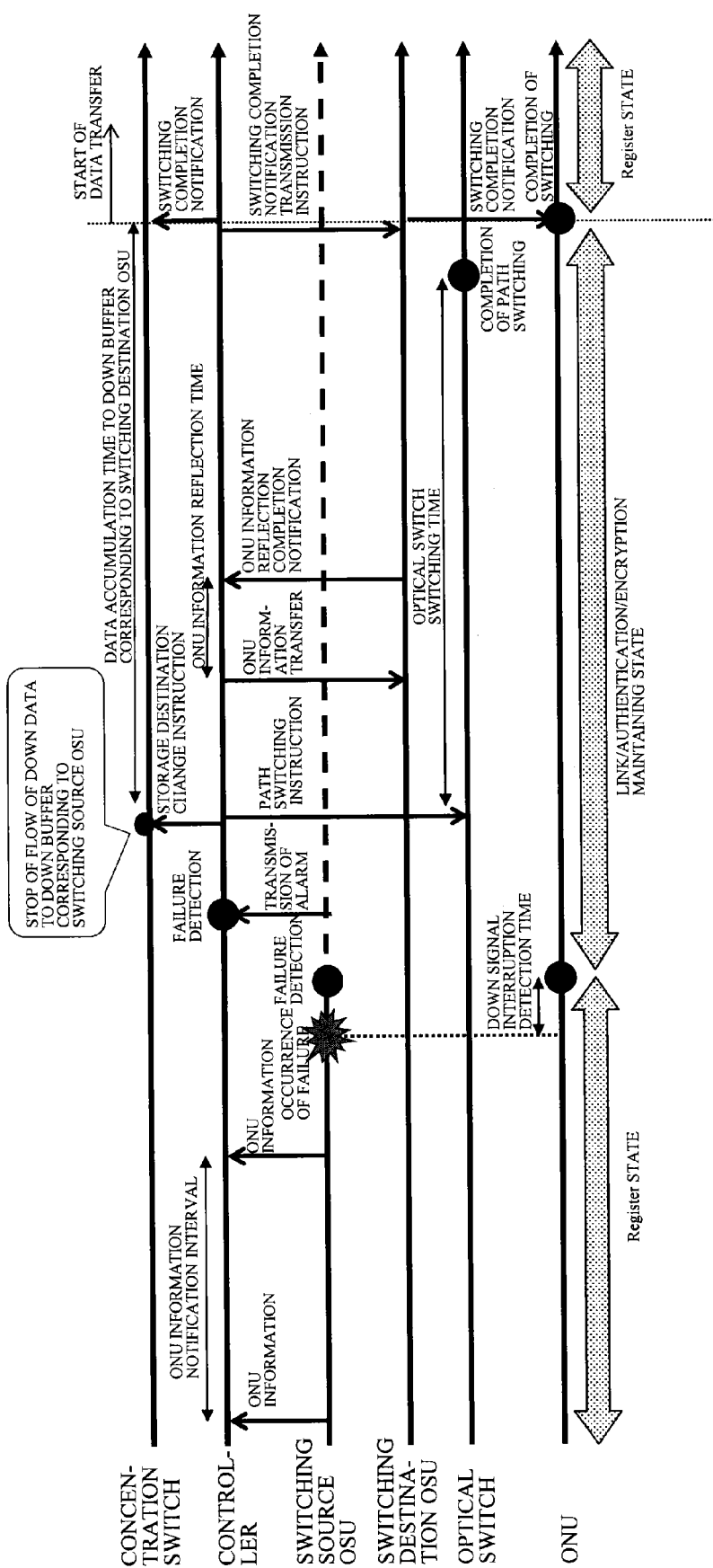
FIG. 16 shows an example of the switching sequence when the OSU is failed, according to Embodiment 2 of the second disclosure when the ONU information reflection time is shorter than the optical switch switching time.

Since the PON controller 33 of the OSU 15 in FIG. 12 is provided with a function of detecting its own failure and an alarm transmission function, the OLT configuration in this embodiment is similar to that in FIG. 12. In the switching sequence, since the failure detecting portion is different from that in Embodiment 1, the switching sequence in this embodiment is shown in FIGS. 15 and 16. FIG. 15 shows a case where the ONU information reflection time is longer than the optical switch switching time, and FIG. 16 shows the opposite case. In FIGS. 15 and 16, the sequence in the failure detecting portion is the same, and the switching source OSU 15 first detects abnormality of a specified function occurring in itself and transmits an alarm signal indicating the fact to the controller 20. The controller 20 receives the alarm signal to detect and recognize the failure of the switching source OSU 15, and, thus, to immediately transmit the storage destination change instruction to the concentration switch 40. Since the subsequent sequence is similar to that in FIG. 13 or 14, the description will be omitted here.

The above switching sequence and the OLT configuration in FIG. 12 are applied to the PON protection using the optical switch 16, whereby the OSU 15 can be switched at high speed while suppressing the frame loss even in the failure of the OSU 15 without ONU information notification interruption.

Embodiment 3 of Second Disclosure

Figure 17:
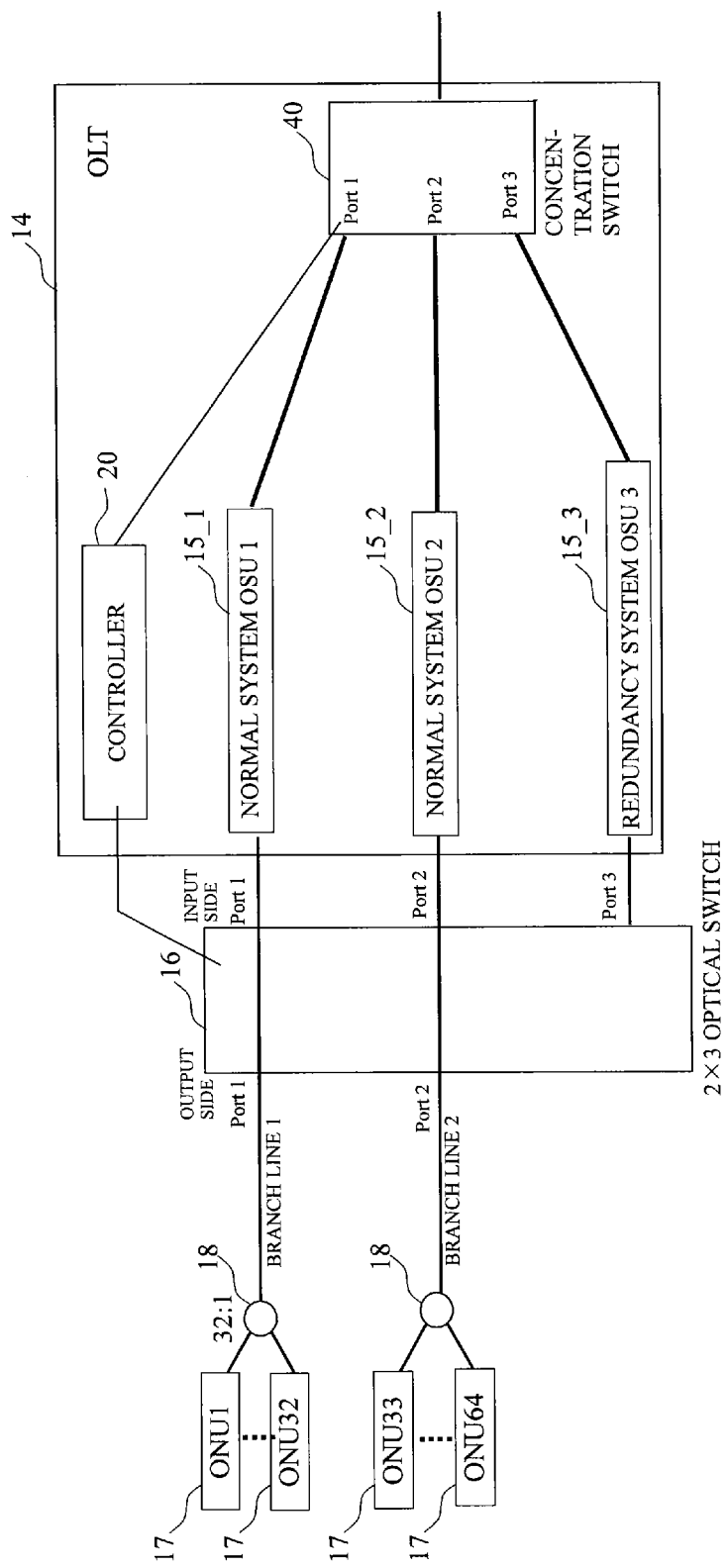
FIG. 17 shows an example of the N:1 protection when N=2.
Figure 23:
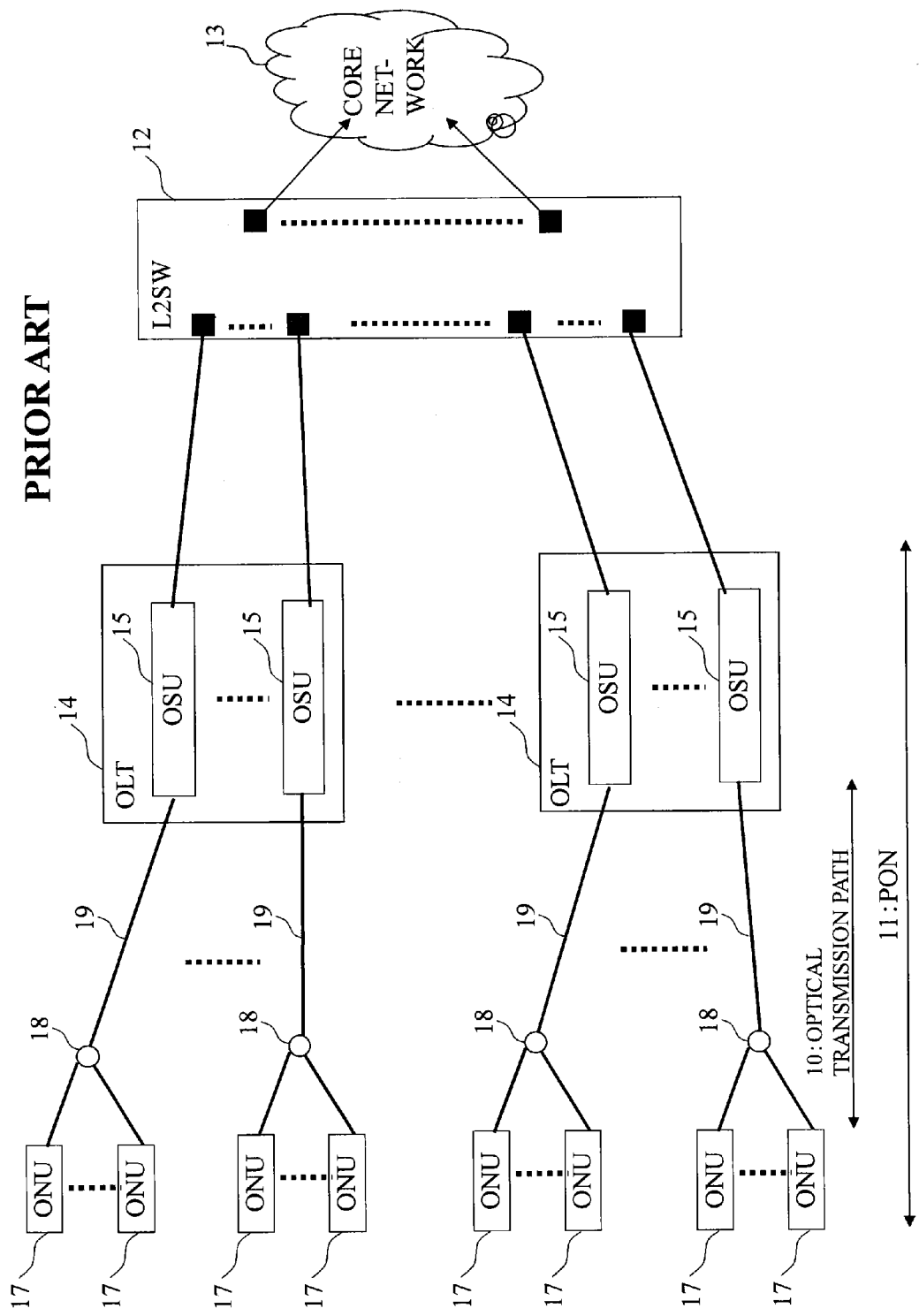
FIG. 23 shows an example of a configuration of an access network.

FIG. 17 shows an example in which the switching sequence and the OLT configuration in Embodiments 1 and 2 are applied to a PON system using the optical switch 16. In this embodiment, a system in a case where N=2 based on an N:1 protection in FIG. 23 is shown, and among three OSUs 15 in the OLT 14, two OSU 15_1 and OSU 15_2 are normal system OSUs, and one OSU 15_3 is a redundancy system OSU. When A=32, it is considered a case where in a normal time, each of the normal systems OSU 15_1 and 15_2 stores 32 ONUs 17 through a 2×3 optical switch 16 and a branch line 1 or 2, and the redundancy system OSU 3 is not connected to any branch line through the 2×3 optical switch 16. In a normal time, each of the two normal system OSUs 15_1 to 15_2 notifies the controller 20 of the ONU information about the subordinated ONUs 17, so that the controller 20 holds the management table 21 shown in FIG. 18.

Figure 19:
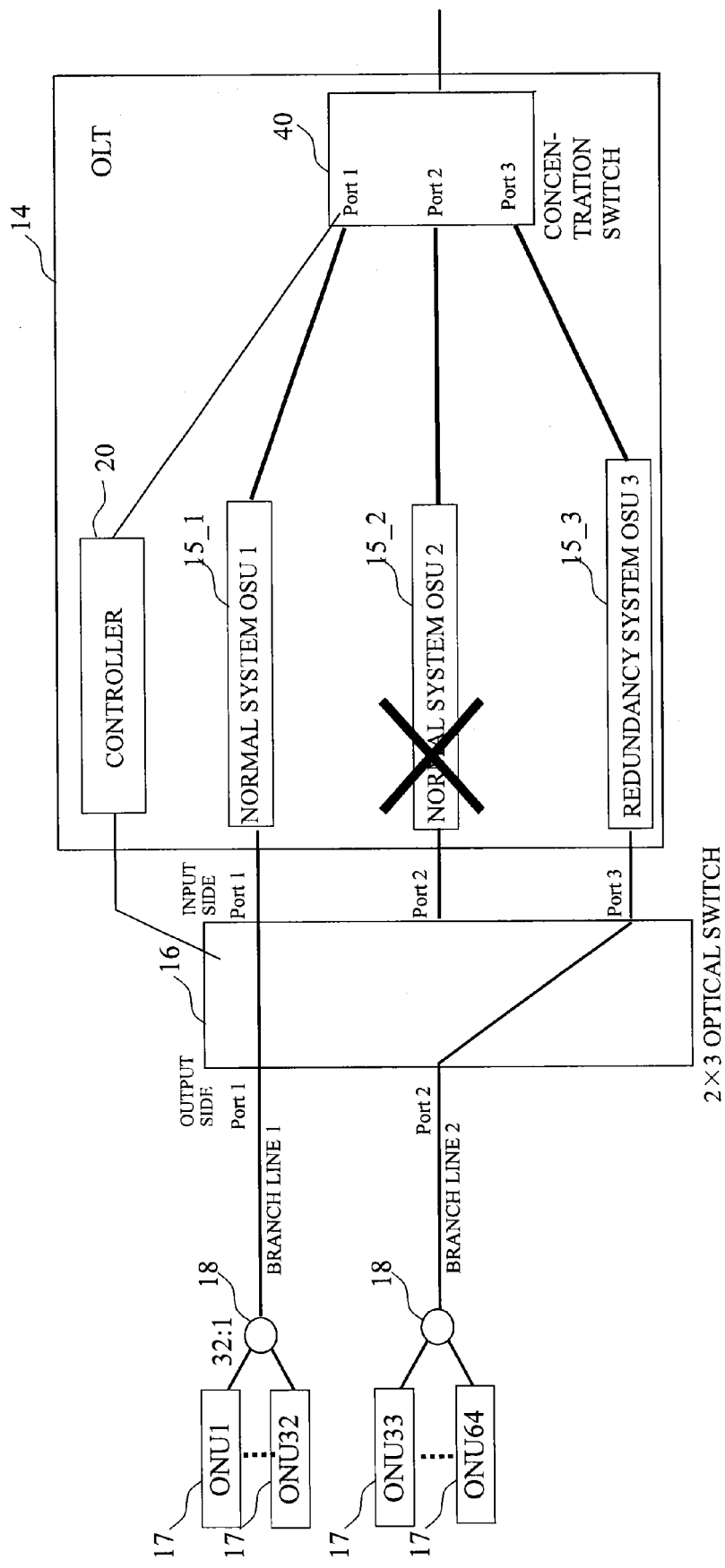
FIG. 19 shows an explanatory view of a switching operation when an OSU is failed, according to Embodiment 3 of the second disclosure.

In such a system, for example when the OSU 15_2 is failed, the controller detects the OSU failure through the switching sequence described in Embodiment 1 or 2. Since the controller 20 previously grasps, through the management table 21 and an initial setting, the connection situation of the OSU 15_2 and the fact that the OSU 15_3 is not connected to a branch line and is connected to a port 3 of the concentration switch 40, the controller 20 judges that a connection destination input side port number of an output side port 2 in the optical switch 16 may be changed from 2 to 3. As a result of the switching sequence described in Embodiment 1 or 2, the system in FIG. 17 is finally changed to the system shown in FIG. 19, and the contents of the management table of FIG. 18 are changed to the contents shown in FIG. 20.

As described above, the OLT 14 and the switching sequence of the present disclosure can be applied to a conventional N:1 protection method, and the OSU switching can be performed at high speed while suppressing the frame loss in comparison with the conventional method.

Embodiment 4 of Second Disclosure

Figure 21:
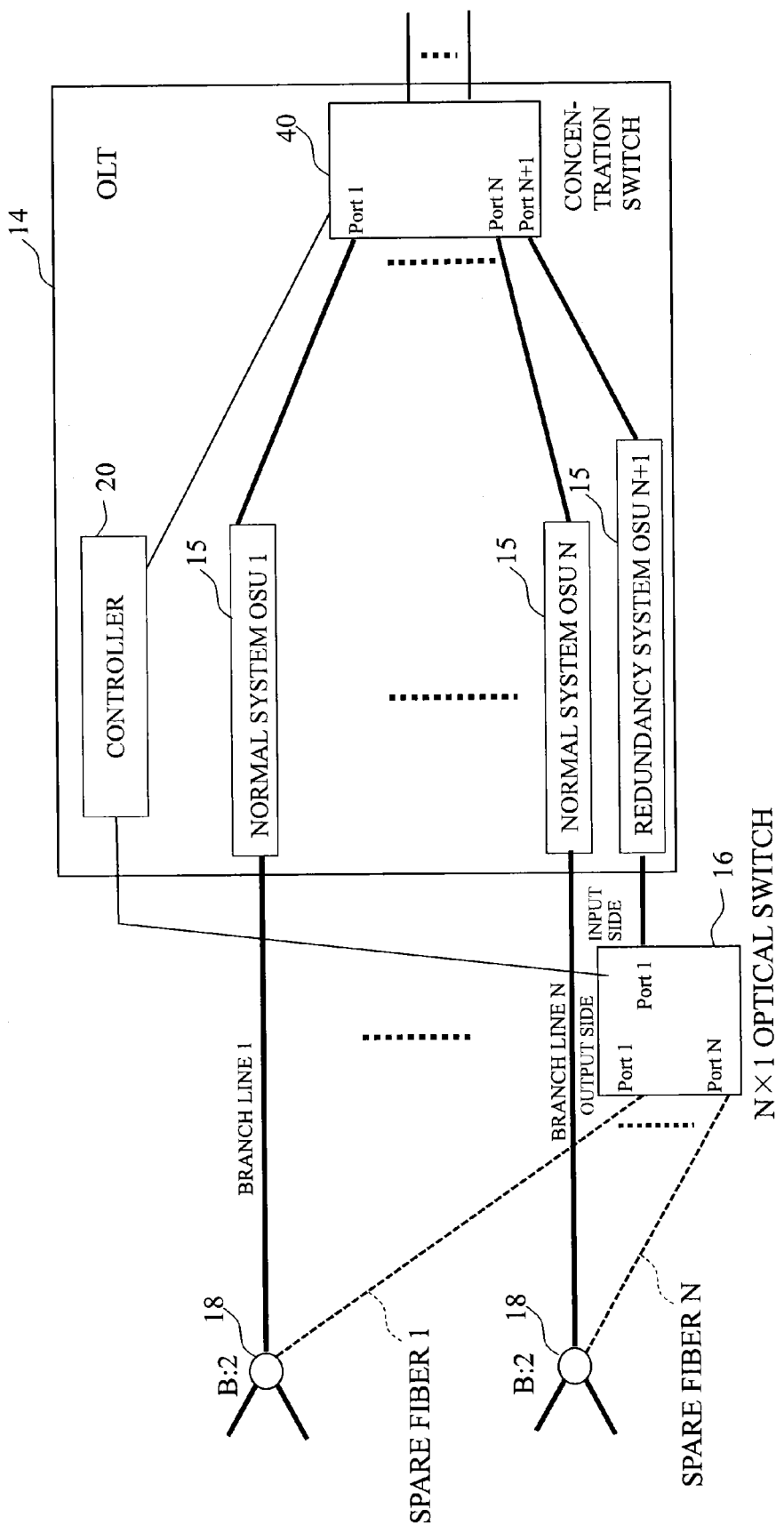
FIG. 21 shows an example of the N:1 protection in which optical switch exchange is easy, according to Embodiment 4 of the second disclosure.

In a configuration in which the OLT 14 and the switching sequence are applied to the N:1 protection method like that in Embodiment 3, there is a problem that when an N×(N+1) optical switch 16 is failed in a normal time, communication of all ONUs 17 are interrupted. When the optical switch 16 is exchanged to new one due to such an optical switch failure, and when the optical switch 16 is removed from the system for the purpose of maintenance, the communication interruption of the ONU 17 occurs. Thus, FIG. 21 shows an N:1 protection configured that the optical switch 16 can be easily exchanged without a problem such as communication interruption even in such a case.

In this embodiment, an OLT 14, an N×1 optical switch 16, N B:2 optical splitters 18 (1≤B≤A; however, when cost is not considered, it may be B>A technically), and A×N or less ONUs 17 are used. Among N+1 OSUs 15 in the OLT 14, N OSUs 15 (OSU 1 to OSU N) are normal system OSUs, and the remaining one is a redundancy system OSU 15 (OSU N+1). Each of the N normal system OSUs 15 is connected to one port on a 2 side of the N B:2 optical splitters 18 through a branch line, and the redundancy system OSU 15 is connected to a 1 side (input side) of the N×1 optical switch 16 through an optical fiber. One port on the 2 side of the N B:2 optical splitters 18 is connected to the N side of the N×1 optical switch 16 through an optical fiber (referred to as a spare fiber), a B side of the B:2 optical splitter 18 is connected to up to B ONUs 17 through up to B optical fibers. At the time of initial construction, the path of any port on the N side of the N×1 optical switch 16 is not connected to the ports on the 1 side so as to prevent output light from the redundancy system OSU 15 from colliding with output light from the normal system OSU 15 at a lower order section than the B:2 optical splitter 18 through the N×1 optical switch 16 and the spare fiber.

At the time of initial construction, the redundancy system OSU 15 may be in the light emission OFF state so as to prevent output light from the redundancy system OSU 15 from colliding with output light from the normal system OSU 15 at a lower portion than the B:2 optical splitter 18 through the N×1 optical switch 16 and the spare fiber.

In such a system, in a normal time, the normal systems OSU 15 can communicate with the subordinated ONUs 17 not through the optical switch 16. Thus, even if the optical switch failure occurs in a normal time, the communication in the ONU 17 is not affected thereby. When the optical switch 16 is removed from the system for exchange and maintenance, communication between the normal system OSU 15 to the ONU 17 is not affected, the work can be performed for an operator's convenience without noticing communication interruption.

Further, since a branch line is made redundant by a spare fiber in this embodiment, even when branch line interruption occurs, the communication interruption in the ONU 17 can be prevented by the path switching performed by the optical switch 16. In this case, as a detection trigger for the branch line interruption, there is considered a case where the OSU 15 connecting the corresponding branch line detects simultaneous signal interruption from all the subordinated ONUs 17 (detects the up signal interruption from an arbitrary first ONU 17 and then detects the up signal interruption from all other ONUs 17 during a period of time). The corresponding OSU 15 having detected the branch line interruption notifies the controller 20 of an alarm signal, whereby the controller 20 detects and recognizes abnormality of the corresponding branch line and starts switching operation. The sequence after the controller 20 detects the branch line interruption is similar to that in FIG. 15 or 16 in Embodiment 2.

Figure 22:
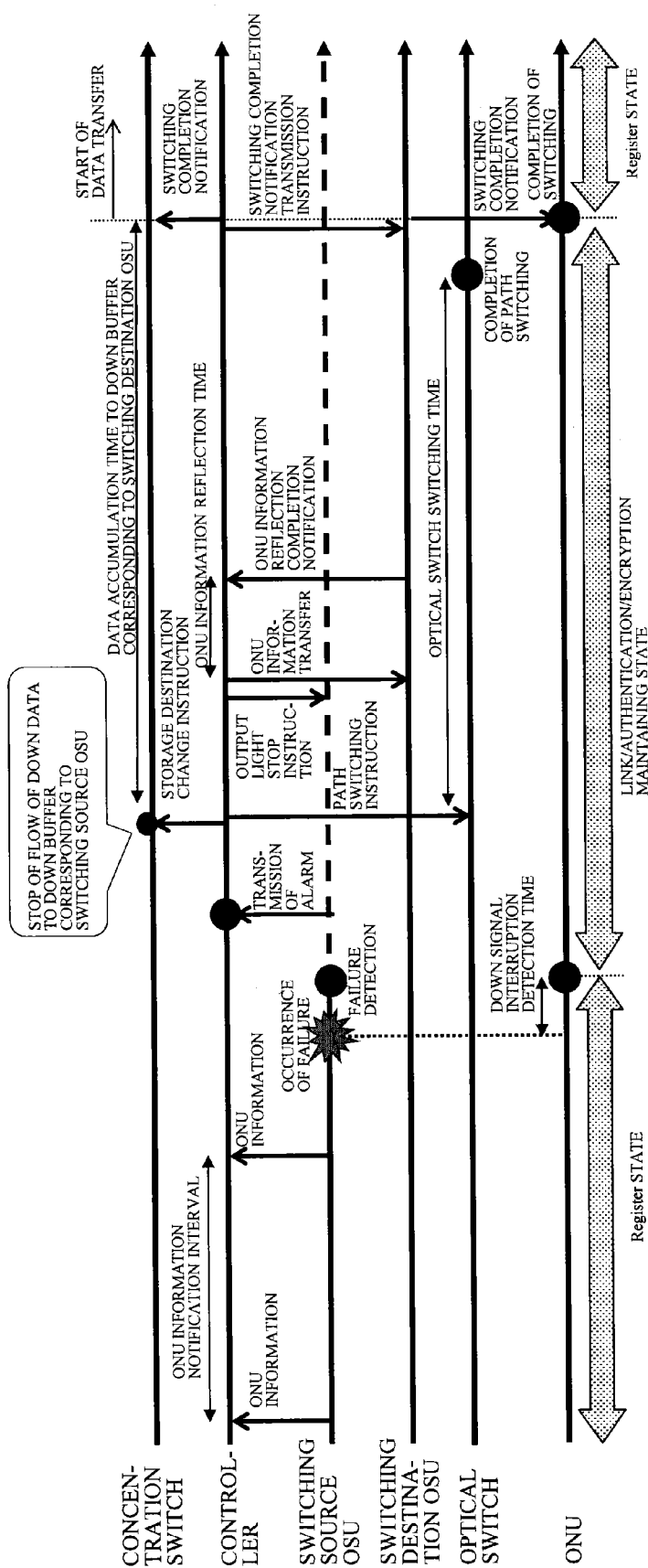
FIG. 22 shows an example of the switching sequence when the OSU is failed, according to Embodiment 4 of the second disclosure when the ONU information reflection time is shorter than the optical switch switching time.

Regarding switching at the time when the OSU 15 is failed, the configuration in this embodiment is different from the configuration in Embodiment 3, and since the branch line does not interpose the optical switch 16, a physical path is maintained between the switching source OSU 15 and the ONU 17 after the path switching performed by the optical switch 16. Thus, as in a failure of a specific function other than a transceiver, for example, there occurs a failure pattern in which communication between the switching source OSU 15 and the ONU 17 is not impossible even after switching, a trouble may occur in data communication between the switching destination OSU 15 and the ONU 17 due to a signal from the switching source OSU 15. In order to prevent such a situation, there is considered a method in which before the switching source OSU 15 starts data communication with the ONU 17, a power source and a transmitter of the switching source OSU 15 are stopped. Accordingly, in the switching sequence in this embodiment, an instruction to stop the power source or the transmitter from the controller 20 to the switching source OSU 15 is preferably added to the sequences in FIGS. 13 to 16. In this example, both the instructions are collectively represented as "output light stop instructions", and only a case based on the sequence in FIG. 16 is shown in FIG. 22. The timing at which the output light stop instruction is transmitted is not limited to the timing in FIG. 22 (transmitted between the path switching instruction and the ONU information transfer), and the instruction may be transmitted at arbitrary timing after failure detection (after reception of an alarm from the switching source OSU 15). However, in the OSU 15 provided with an internal capacitor, since the operation can be performed during a period of time after the power source is stopped, it is preferable that the output light stop instruction is transmitted to the failed OSU 15 early after the controller 20 detects the failure.

As a sequence diagram of this embodiment, only a case based on the sequence in FIG. 16 is shown in FIG. 22; however, cases based on the sequences in FIGS. 13, 14, and 15 can be applied in the same way of thinking as in FIG. 22 (illustration is omitted here).

Embodiment 5 of Second Disclosure

Although a normal ONU 17 corresponds to an OLT 14 according to this embodiment, when the following ONU 17 assuming the failure of the above OSU 15 is applied, a further effect can be obtained.

In this example, the ONU 17 described in the flows of FIGS. 13, 14, 15, 16 and 22 will be described. Namely, when the ONU 17 detects down signal interruption, the ONU 17 maintains link/authentication/encryption (information relating to control/management/registration) and continues to accumulate the received up frames in the buffer in the ONU 17 until restart of transmission. When the switching of the OSU 15 is completed, the down signal or the switching completion notification is transmitted from the switching destination OSU 15 to the ONU 17, so that the ONU 17 grasps completion of switching of the OSU 15. Thus, the ONU 17 restarts transmission of the up frame to the ONU 15, using the previous link/authentication/encryption (information relating to control/management/registration). According to this constitution, the time until retransmission can be shortened, and, it is possible to obtain an effect of reducing a loss of frame.

As described above, the N:1 protection in the constitution in this embodiment can correspond to not only the failure of the OSU 15 but also the branch line interruption, even if the optical switch failure occurs in a normal time, data communication is not affected thereby, and there is advantage of enabling to exchange the optical switch 16 for an operator's convenience.

In each embodiment, there has been described a configuration in which the concentration switch 40 and the OSU 15 are built in the OLT 14. Even in a case where the concentration switch 40 is externally attached to the OLT 14 separately from the OSU 15, the technique of the present disclosure can be realized. In this case, transmission and reception of signals between the controller 20 in the OLT 14 and the concentration switch 40 outside the OLT 14 and transmission and reception of signals between the OSU 15 in the OLT 14 and the concentration switch 40 outside the OLT 14 are as described above.

INDUSTRIAL APPLICABILITY

The present disclosure can be applied to information and communication industry.

REFERENCE SIGNS LIST

10: Optical transmission path
11: PON
12: L2SW
13: Core network
14: OLT
15, 15_1, 15_2, 15_3: OSU
16: Optical switch
17: ONU
18: Optical splitter
19: Optical fiber
20: Controller
21: Management table
22: Failure detector
23: Switching controller
24: Operation processor
25: OSU/ONU/optical switch management controller
31: PON-IF
32: PON signal processor
33: PON controller
40: Concentration switch
41: Buffer
42: Multiplexer
43: Concentration/sorting controller

What is claimed is:

1. A station-side termination apparatus comprising:
one or more of a plurality of switching source OSUs which connects an arbitrary subscriber termination apparatus, receives an up signal from the stored subscriber termination apparatus and, transmits a down signal to the stored subscriber termination apparatus;
a concentration switch which multiplexes the up signals received by the respective switching source OSUs and, outputs the down signal to a storage destination OSU of the subscriber termination apparatus as a transmission destination of the down signal concerned;
and a controller which controls the storage destination OSU of each of the subscriber termination apparatuses, wherein
when the storage destination OSU of the subscriber termination apparatus is switched from a switching source OSU to a switching destination OSU, the controller transmits, to the concentration switch, such a storage destination change instruction that the storage destination OSU of the subscriber termination apparatus is switched, instructs the switching source OSU to stop transmission of a transmission permission message, and, notifies information of the subscriber termination apparatus to be stored in the switching destination OSU, whereby the concentration switch performs buffering of the down signal to the subscriber termination apparatus having been stored in the switching source OSU, the switching destination OSU having received information of the subscriber termination apparatus performs setting of the subscriber termination apparatus to be stored in the switching destination OSU,
when the switching destination OSU completes the setting of the subscriber termination apparatus to be stored in the switching destination OSU, and the controller notifies the concentration switch and the switching destination OSU of completion of switching from the switching source OSU to the switching destination OSU, whereby concentration switch outputs a buffered down signal to the switching destination OSU, and, the switching destination OSU notifies the subscriber termination apparatus to be stored in the switching destination OSU of restart of transmission.

2. The station-side termination apparatus according to claim 1, wherein when the concentration switch receives the storage destination change instruction, the concentration switch switches a down buffer addressed to the switching source OSU to a down buffer addressed to the switching destination OSU, accumulates the down signal to be output to the switching destination OSU in the down buffer addressed to the switching destination OSU, notifies the controller of completion of remaining data processing upon completion of output processing of data having been accumulated in the up or down buffer corresponding to the switching source OSU, the switching source OSU stops transmission of the transmission permission message to the subordinate subscriber termination apparatus in accordance with the transmission stop instruction of the transmission permission message and, notifies the controller of completion of the remaining data processing upon completion of the output processing of the up or down signal accumulated in the up or down buffer possessed by itself, and the controller notifies the concentration switch and the switching destination OSU of the switching completion upon reception of completion of the remaining data processing from both the concentration switch and the switching source OSU and completion of setting of the subscriber termination apparatus performed by the switching destination OSU.

3. The station-side termination apparatus according to claim 2, further comprising an optical switch controlling a connection state between each subscriber termination apparatus and each OSU to switch the subscriber termination apparatus stored in each OSU, wherein when the storage destination OSU of the subscriber termination apparatus is switched from the switching source OSU to the switching destination OSU, the controller transmits, to the concentration switch, such a storage destination change instruction that the storage destination OSU of the subscriber termination apparatus is switched, instructs the switching source OSU to stop transmission of the transmission permission message, notifies the switching destination OSU of the information of the subscriber termination apparatus to be stored in the switching destination OSU, and, notifies the optical switch of the information of the switching destination OSU and the subscriber termination apparatus stored in the switching destination OSU concerned, whereby the concentration switch performs buffering of the down signal to the subscriber termination apparatus having been stored in the switching source OSU and, performs setting of the subscriber termination apparatus stored in the switching destination OSU having received the information of the subscriber termination apparatus, the optical switch connects the notified subscriber termination apparatus to the switching destination OSU, and after setting of the subscriber termination apparatus stored in the switching destination OSU is completed by the switching destination OSU and after connection between the notified subscriber termination apparatus and the switching destination OSU is completed by the optical switch, the controller notifies the concentration switch of completion of the switching from the switching source OSU to the switching destination OSU, whereby the concentration switch outputs the buffered down signal to the switching destination OSU, and, the switching destination OSU notifies the subscriber termination apparatus stored in the switching destination OSU of restart of transmission.

4. The station-side termination apparatus according to claim 3, wherein the information of the subscriber termination apparatus stored in the switching destination OSU is notified to the optical switch, and the optical switch connects the notified subscriber termination apparatus to the switching destination OSU, whereby the controller transmits the storage destination change instruction to the concentration switch, instructs the switching source OSU to stop transmission of the transmission permission message, and notifies the information of the subscriber termination apparatus stored in the switching destination OSU.

5. An optical network system comprising:
the station-side termination apparatus according to claim 1; and
a subscriber termination apparatus.

6. The station-side termination apparatus according to claim 1, further comprising an optical switch controlling a connection state between each subscriber termination apparatus and each switching source OSU to switch the subscriber termination apparatus stored in each switching source OSU, wherein when the storage destination OSU of the subscriber termination apparatus is switched from the switching source OSU to the switching destination OSU, the controller transmits, to the concentration switch, such a storage destination change instruction that the storage destination OSU of the subscriber termination apparatus is switched, instructs the switching source OSU to stop transmission of the transmission permission message, notifies the switching destination OSU of the information of the subscriber termination apparatus to be stored in the switching destination OSU, and, notifies the optical switch of the information of the switching destination OSU and the subscriber termination apparatus stored in the switching destination OSU concerned, whereby the concentration switch performs buffering of the down signal to the subscriber termination apparatus having been stored in the switching source OSU and, performs setting of the subscriber termination apparatus stored in the switching destination OSU having received the information of the subscriber termination apparatus, the optical switch connects the notified subscriber termination apparatus to the switching destination OSU, and after setting of the subscriber termination apparatus stored in the switching destination OSU is completed by the switching destination OSU and after connection between the notified subscriber termination apparatus and the switching destination OSU is completed by the optical switch, the controller notifies the concentration switch of completion of the switching from the switching source OSU to the switching destination OSU, whereby the concentration switch outputs the buffered down signal to the switching destination OSU, and, the switching destination OSU notifies the subscriber termination apparatus stored in the switching destination OSU of restart of transmission.

7. The station-side termination apparatus according to claim 6, wherein the information of the subscriber termination apparatus stored in the switching destination OSU is notified to the optical switch, and the optical switch connects the notified subscriber termination apparatus to the switching destination OSU, whereby the controller transmits the storage destination change instruction to the concentration switch, instructs the switching source OSU to stop transmission of the transmission permission message, and notifies the information of the subscriber termination apparatus stored in the switching destination OSU.

8. A method of switching one or more of a plurality of switching source OSUs of a station-side termination apparatus, in which a switching source OSU which connects an arbitrary subscriber termination apparatus, receives an up signal from the stored subscriber termination apparatus and, transmits a down signal to the stored subscriber termination apparatus, a concentration switch which multiplexes the up signals received by the respective switching source OSUs and, outputs the down signal to a storage destination OSU of the subscriber termination apparatus as a transmission destination of the down signal concerned, and a controller which controls the storage destination OSU of each of the subscriber termination apparatuses, the OSU switching method comprising:

an OSU switching procedure in which the controller transmits, to the concentration switch, such a storage destination change instruction that the storage destination OSU of the subscriber termination apparatus is switched, instructs the switching source OSU to stop transmission of a transmission permission message, and, notifies the information of the subscriber termination apparatus to be stored in the switching destination OSU, whereby the concentration switch performs buffering of the down signal to the subscriber termination apparatus have been stored in the switching source OSU, and, the switching destination OSU having received information of the subscriber termination apparatus performs setting of the subscriber termination apparatus to be stored therein; and a data transmission start procedure in which after the switching destination OSU completes the setting of the subscriber termination apparatus to be stored therein, the controller notifies the concentration switch and the switching destination OSU of completion of switching from the switching source OSU to the switching destination OSU, whereby the concentration switch outputs the buffered down signal to the switching destination OSU, and, the switching destination OSU notifies the subscriber termination apparatus to be stored therein of restart of transmission.

9. The OSU switching method in the station-side termination apparatus according to claim 8, wherein in the OSU switching procedure, when the concentration switch receives the storage destination change instruction, the concentration switch switches a down buffer addressed to the switching source OSU to a down buffer addressed to the switching destination OSU, accumulates the down signal to be output to the switching destination OSU in the down buffer addressed to the switching destination OSU, and, notifies the controller of completion of remaining data processing on completion of output processing of data having been accumulated in the up or down buffer corresponding to the switching source OSU, the switching source OSU stops transmission of the transmission permission message to the subordinated subscriber termination apparatus in accordance with the transmission stop instruction of the transmission permission message, and, notifies the controller of completion of the remaining data processing upon completion of the output processing of the up or down signal accumulated in the up or down buffer possessed by itself, and in the data transmission start procedure, the controller notifies the concentration switch and the switching destination OSU of the switching completion upon reception of the notifications of the completion of the remaining data processing from both the concentration switch and the switching source OSU and completion of setting of the subscriber termination apparatus performed by the switching destination OSU.

10. The OSU switching method in the station-side termination apparatus according to claim 9, wherein in the OSU switching procedure, the controller transmits, to the concentration switch, such a storage destination change instruction that the storage destination OSU of the subscriber termination apparatus is switched, instructs the switching source OSU to stop the transmission of the transmission permission message, notifies the switching destination OSU of the information of the subscriber termination apparatus to be stored in the switching destination OSU, and, notifies the optical switch of the information of the switching destination OSU and the subscriber termination apparatus to be stored in the switching destination OSU concerned, whereby the concentration switch performs buffering of the down signal to the subscriber termination apparatus having been stored in the switching source OSU, the switching destination OSU having received the information of the subscriber termination apparatus performs setting of the subscriber termination apparatus to be stored therein, the optical switch connects the notified subscriber termination apparatus to the switching destination OSU, in the data transmission start procedure, when the switching destination OSU completes the setting of the subscriber termination apparatus to be stored therein and when the optical switch completes the connection between the notified subscriber termination apparatus and the switching destination OSU, the controller notifies the concentration switch of the completion of switching from the switching source OSU to the switching destination OSU, whereby the concentration switch outputs the buffered down signal to the switching destination OSU, and, the switching destination OSU notifies the subscriber termination apparatus to be stored therein of restart of transmission.

11. The OSU switching method in the station-side termination apparatus according to claim 10, wherein in the OSU switching procedure, the information of the subscriber termination apparatus stored in the switching destination OSU is notified to the optical switch, and the optical switch connects the notified subscriber termination apparatus to the switching destination OSU, whereby the controller transmits the storage destination change instruction to the concentration switch, instructs the switching source OSU to stop transmission of the transmission permission message, and, notifies the switching destination OSU of the information of the subscriber termination apparatus stored in the switching destination OSU.

12. The OSU switching method in the station-side termination apparatus according to claim 8, wherein in the OSU switching procedure, the controller transmits, to the concentration switch, such a storage destination change instruction that the storage destination OSU of the subscriber termination apparatus is switched, instructs the switching source OSU to stop the transmission of the transmission permission message, notifies the switching destination OSU of the information of the subscriber termination apparatus to be stored in the switching destination OSU, and, notifies the optical switch of the information of the switching destination OSU and the subscriber termination apparatus to be stored in the switching destination OSU concerned, whereby the concentration switch performs buffering of the down signal to the subscriber termination apparatus having been stored in the switching source OSU, the switching destination OSU having received the information of the subscriber termination apparatus performs setting of the subscriber termination apparatus to be stored therein, the optical switch connects the notified subscriber termination apparatus to the switching destination OSU, in the data transmission start procedure, when the switching destination OSU completes the setting of the subscriber termination apparatus to be stored therein and when the optical switch completes the connection between the notified subscriber termination apparatus and the switching destination OSU, the controller notifies the concentration switch of the completion of switching from the switching source OSU to the switching destination OSU, whereby the concentration switch outputs the buffered down signal to the switching destination OSU, and, the switching destination OSU notifies the subscriber termination apparatus to be stored therein of restart of transmission.

13. The OSU switching method in the station-side termination apparatus according to claim 12, wherein in the OSU switching procedure, the information of the subscriber termination apparatus stored in the switching destination OSU is notified to the optical switch, and the optical switch connects the notified subscriber termination apparatus to the switching destination OSU, whereby the controller transmits the storage destination change instruction to the concentration switch, instructs the switching source OSU to stop transmission of the transmission permission message, and, notifies the switching destination OSU of the information of the subscriber termination apparatus stored in the switching destination OSU.

14. A station-side termination apparatus comprising:

a switching source OSU which receives an up signal from a subscriber termination apparatus and, transmits an input down signal to the subscriber termination apparatus;

a switching destination OSU which, instead of any of the switching source OSUs, receives the up signal from the subscriber termination apparatus and, transmits the down signal to the subscriber termination apparatus;

a concentration switch which multiplexes the up signals received by the switching source OSU and the switching destination OSU and, separates the down signals for each predetermined data to output the down signals to either the switching source OSU or the switching destination OSU; and a controller which detects a failure of the switching source OSU and controls operation of the switching source OSU, the switching destination OSU, and the concentration switch corresponding to the presence or absence of the failure, wherein in such a state that the controller does not detect the failure of the switching source OSU, the controller reads the information relating to control, management, or registration of the subscriber termination apparatus of each of the switching source OSUs periodically or at the time of updating the information and accumulates the information, the controller monitors the switching source OSU, in such a state that the controller detects the failure of the switching source OSU, the controller issues, to the concentration switch, such a storage destination change instruction that a storage destination of the down signal is changed from the switching source OSU to the switching destination OSU, the concentration switch switches the storage destination of the down signal in accordance with the storage destination change instruction and, accumulates the down signal addressed to the switching destination in a down buffer, the controller writes the accumulated information about the failed OSU in the switching destination OSU, the switching destination OSU notifies the controller of completion of reflection after completion of setting of the information, the controller issues a transmission instruction to the switching destination OSU based on the reflection completion notification, the switching destination OSU starts transmission and reception with the subscriber termination apparatus based on the transmission instruction, the controller notifies the concentration switch of the completion of switching based on the reflection completion notification, the concentration switch transmits the down signal accumulated in the down buffer to the switching destination OSU based on the switching completion notification and then transmits the down signal input to the concentration switch.

15. The station-side termination apparatus according to claim 14, wherein

N (N is a natural number) switching sources OSU are provided, one switching destination OSU is provided, the optical switch has an optical input/output port of a first group consisting of N optical input/output ports and an optical input/output port of a second group consisting of N+1 optical input/output ports, each of the optical input/output ports of the first group is connected to the subscriber termination apparatus side, each of the optical input/output ports of the second group is connected to the switching source OSU side or the switching destination OSU side, and arbitrary one of the optical input/output ports of the first group is connectable to arbitrary one of the optical input/output ports of the second group based on instruction from outside.

16. The station-side termination apparatus according to claim 14, wherein

N (N is a natural number) switching sources OSU are provided, one switching destination OSU is provided, the optical switch has an optical input/output port of a first group consisting of N optical input/output ports, an optical input/output port of a second group consisting of one optical input/output ports, N B-to-2 optical splitters (B is an arbitrary natural number), one side of the B-to-2 optical splitters branched into two is connected to each of the optical input/output ports of the first group, the other branched side is connected to each of the switching source OSUs side, the optical input/output ports of the second group is connected to the switching destination OSU side, and the optical input/output port of the second group is connectable to arbitrary one of the optical input/output ports of the first group based on instruction from outside.

17. An optical network system comprising:

the station-side termination apparatus according to claim 14; and a subscriber termination apparatus.

18. The optical network system according to claim 17, wherein in a case where the controller detects a failure of the switching source OSU, when the subscriber termination apparatus detects a down signal interruption from the switching source OSU, the subscriber termination apparatus accumulates an up signal input to the subscriber termination apparatus in an upper buffer, when the subscriber termination apparatus detects switching from the switching source OSU to the switching destination OSU, the subscriber termination apparatus starts communication with the switching destination OSU after the switching, using information relating to control, management, or registration before the switching, and the subscriber termination apparatus transmits the up signal accumulated in the up buffer to the switching destination OSU and then transmits the up signal to be input to the subscriber termination apparatus.

19. A method of switching a plurality of switching source OSUs of a station-side termination apparatus, which includes a at least one of the switching source OSUs that receives an up signal from a subscriber termination apparatus and, transmits an input down signal to the subscriber termination apparatus, a switching destination OSU which, instead of any of the switching source OSUs, receives an up signal from the subscriber termination apparatus and, transmits a down signal to the subscriber termination apparatus, a concentration switch which multiplexes the up signals received by the switching source OSU and the switching destination OSU and, separates the down signal for each predetermined data to output the down signal to either the switching source OSU or the switching destination OSU, a controller which detects a failure of the switching source OSU and controls operation of the switching source OSU, the switching destination OSU, and the concentration switch corresponding to the presence or absence of the failure, wherein in such a state that the controller does not detect the failure of the switching source OSU, the method comprising, in sequence, a monitoring procedure in which a signal is transmitted and received between the switching source OSU and the subscriber termination apparatus, the information relating to control, management, and registration of the subscriber termination apparatus possessed by each of the switching source OSUs is read out periodically or at the time of updating the information and accumulated, and, the switching source OSU is monitored, an OSU switching procedure in which the information about the failed switching source OSU that is accumulated in the monitoring procedure is set to the switching destination OSU, and, the concentration switch switches the storage destination of the down signal from the failed switching source OSU to the switching destination OSU and, accumulates the down signal addressed to the switching destination in a down buffer, and a data transmission start procedure in which the switching destination OSU starts transmission and reception with the subscriber termination apparatus, and the concentration switch transmits the down signal accumulated in the down buffer to the switching destination OSU and then transmits the down signal to be input to the concentration switch.

20. The OSU switching method in a station-side termination apparatus according to claim 19, wherein in the OSU switching procedure, the subscriber termination apparatus accumulates an input up signal, and in the data transmission start procedure, the subscriber termination apparatus starts communication with the switching destination OSU after switching, using the information relating to control, management, or registration before switching from the switching source OSU to the switching destination OSU and transmits the up signal accumulated in the OSU switching procedure to then transmit a newly input up signal.

* * * * *